US012710976B2

(12) United States Patent
Kelly et al.

(10) Patent No.: US 12,710,976 B2
(45) Date of Patent: Aug. 18, 2026

(54) METHOD AND SYSTEM FOR EUE MAXIMIZATION-BASED FLEX ON DEMAND IN A MULTI-API VIRTUAL DESKTOP INFRASTRUCTURE (VDI) ENVIRONMENT

(71) Applicant: Dell Products L.P., Round Rock, TX (US)

(72) Inventors: John Kelly, Mallow (IE); Dharmesh M. Patel, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 675 days.

(21) Appl. No.: 18/322,478

(22) Filed: May 23, 2023

(65) Prior Publication Data

US 2024/0394088 A1 Nov. 28, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ...... G06F 9/451; G06F 9/45558; G06F 9/542; G06F 2009/4557; H04L 41/5025
See application file for complete search history.

(56) References Cited

U.S. PATENT DOCUMENTS 8,311,038 B2 11/2012 Feuerhahn et al.
8,725,886 B1 5/2014 Pulier et al.
9,407,514 B2 8/2016 Shiva et al.
9,442,771 B2 9/2016 Morgan
9,485,117 B2 11/2016 Ferris
9,710,830 B1 7/2017 Vermeulen et al.
9,740,533 B2 8/2017 Venkataraja et al.
9,817,690 B2 11/2017 Feng et al.
9,864,727 B1 1/2018 Miller et al.
10,789,083 B2 9/2020 Kim et al.
(Continued)

OTHER PUBLICATIONS

Ur Rahman et al., Performance evaluation of VDI environment, The Sixth International Conference on Innovative Computing Technology (INTECH 2016) pp. 104-109, 2016 (6 pages).

*Primary Examiner* — Andy Ho
(74) *Attorney, Agent, or Firm* — Chamberlain, Hrdlicka, White, Williams & Aughtry, P.C.; Aly Z. Dossa

(57) ABSTRACT

A method for managing virtual desktop infrastructure (VDI) environments includes: obtaining, by an orchestrator, a resource related parameter and an end-user experience (EUE) related parameter; assembling, by the orchestrator, an API combination to generate a VDI environment based on a plurality of vendor-provided APIs; testing, by the orchestrator and for an EUE result, the VDI environment across a range of users based on the resource related parameter and EUE related parameter; providing, by the orchestrator, the range of users and VDI environment to an analyzer, in which the analyzer is instructed by the orchestrator to generate a model that maximizes the EUE result in the VDI environment; generating, by the analyzer, a trained model by training the model using at least the range of users, VDI environment, EUE related parameter, resource related parameter, and EUE result; and initiating, by the analyzer, notification of an administrator about the trained model.

20 Claims, 8 Drawing Sheets

(56) References Cited

U.S. PATENT DOCUMENTS

| | | | |
|---|---|---|---|
| 11,126,469 | B2 | 9/2021 | Reque et al. |
| 11,507,431 | B2 | 11/2022 | Kono |
| 11,947,436 | B2 | 4/2024 | Szczepanik et al. |
| 2005/0050175 | A1 | 3/2005 | Fong et al. |
| 2009/0138313 | A1 | 5/2009 | Morgan et al. |
| 2009/0309570 | A1 | 12/2009 | Lehmann et al. |
| 2010/0131959 | A1 | 5/2010 | Spiers et al. |
| 2011/0137713 | A1 | 6/2011 | Dalgas et al. |
| 2012/0089980 | A1 | 4/2012 | Sharp et al. |
| 2013/0097601 | A1 | 4/2013 | Podvratnik et al. |
| 2014/0075029 | A1 | 3/2014 | Lipchuk et al. |
| 2014/0082614 | A1 | 3/2014 | Klein et al. |
| 2015/0106805 | A1 | 4/2015 | Melander et al. |
| 2015/0324232 | A1 | 11/2015 | Wang |
| 2016/0065588 | A1 | 3/2016 | Wheeler |
| 2017/0003951 | A1 | 1/2017 | Newell et al. |
| 2017/0139738 | A1 | 5/2017 | Kim |
| 2017/0279735 | A1 | 9/2017 | Yousaf |
| 2017/0293864 | A1 | 10/2017 | Oh et al. |
| 2018/0225137 | A1 | 8/2018 | Bianchini et al. |
| 2018/0246770 | A1 | 8/2018 | Yu et al. |
| 2018/0267820 | A1 | 9/2018 | Jang |
| 2018/0302299 | A1 | 10/2018 | Sun et al. |
| 2019/0087204 | A1* | 3/2019 | Babol ..................... H04L 67/01 |
| 2020/0028739 | A1 | 1/2020 | Shekar et al. |
| 2020/0186445 | A1 | 6/2020 | Govindaraju et al. |
| 2021/0103458 | A1 | 4/2021 | Manousakis et al. |
| 2021/0373925 | A1 | 12/2021 | Hao et al. |
| 2021/0406053 | A1 | 12/2021 | Mani et al. |
| 2022/0121467 | A1 | 4/2022 | Bonnal Conduzorgues et al. |
| 2022/0292002 | A1* | 9/2022 | Kumar .................... H04L 63/08 |
| 2023/0267010 | A1 | 8/2023 | Wellum et al. |
| 2024/0241978 | A1 | 7/2024 | Chopra et al. |
| 2024/0394376 | A1 | 11/2024 | Kelly et al. |

* cited by examiner

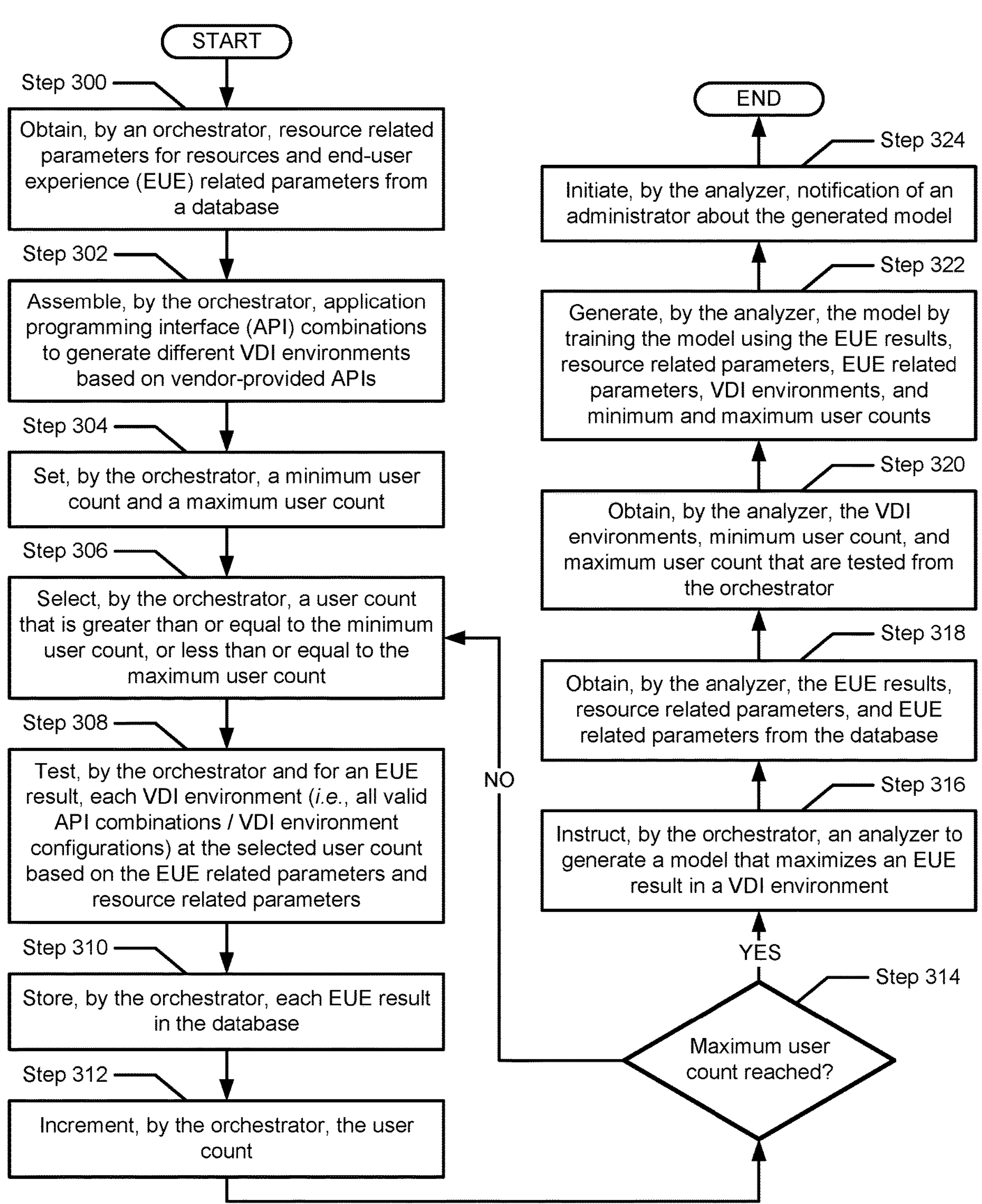
FIG. 3.1

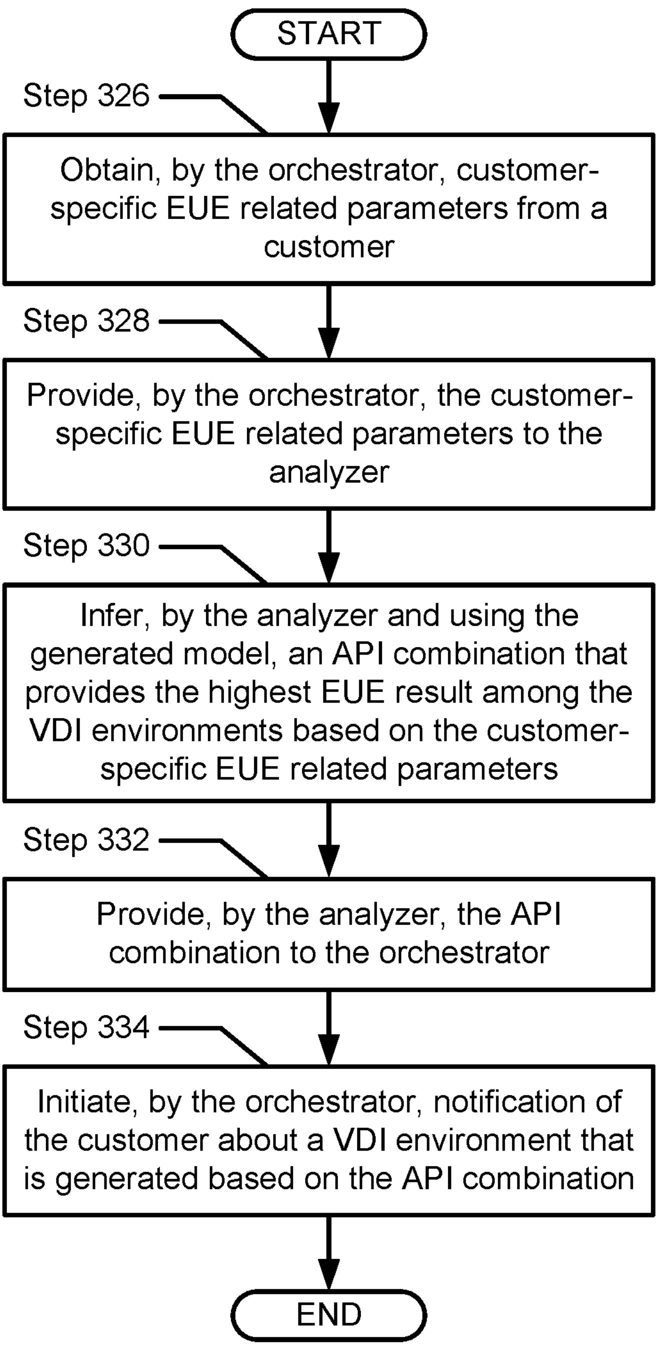
FIG. 3.2

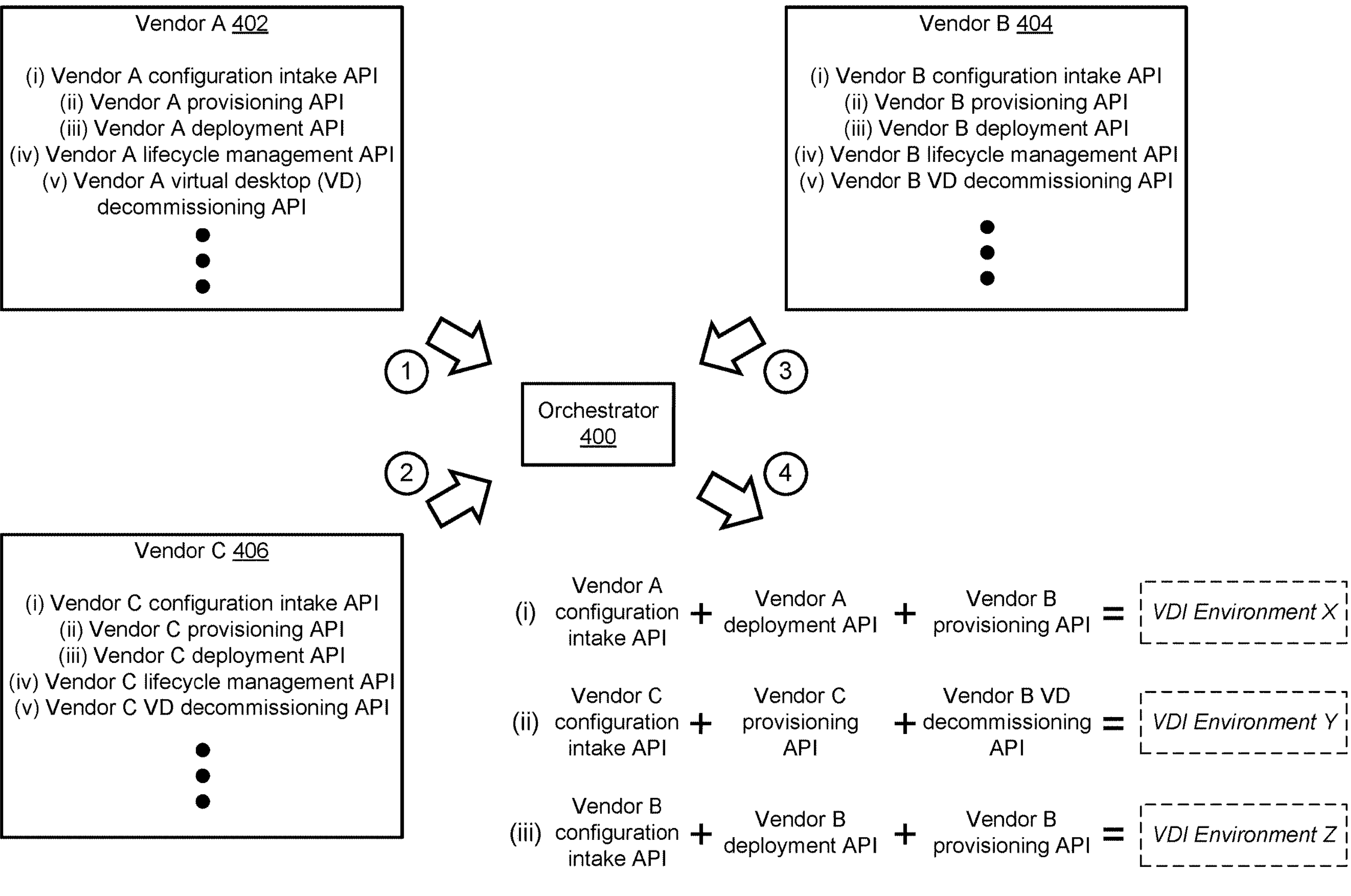
FIG. 4.1

FIG. 4.2

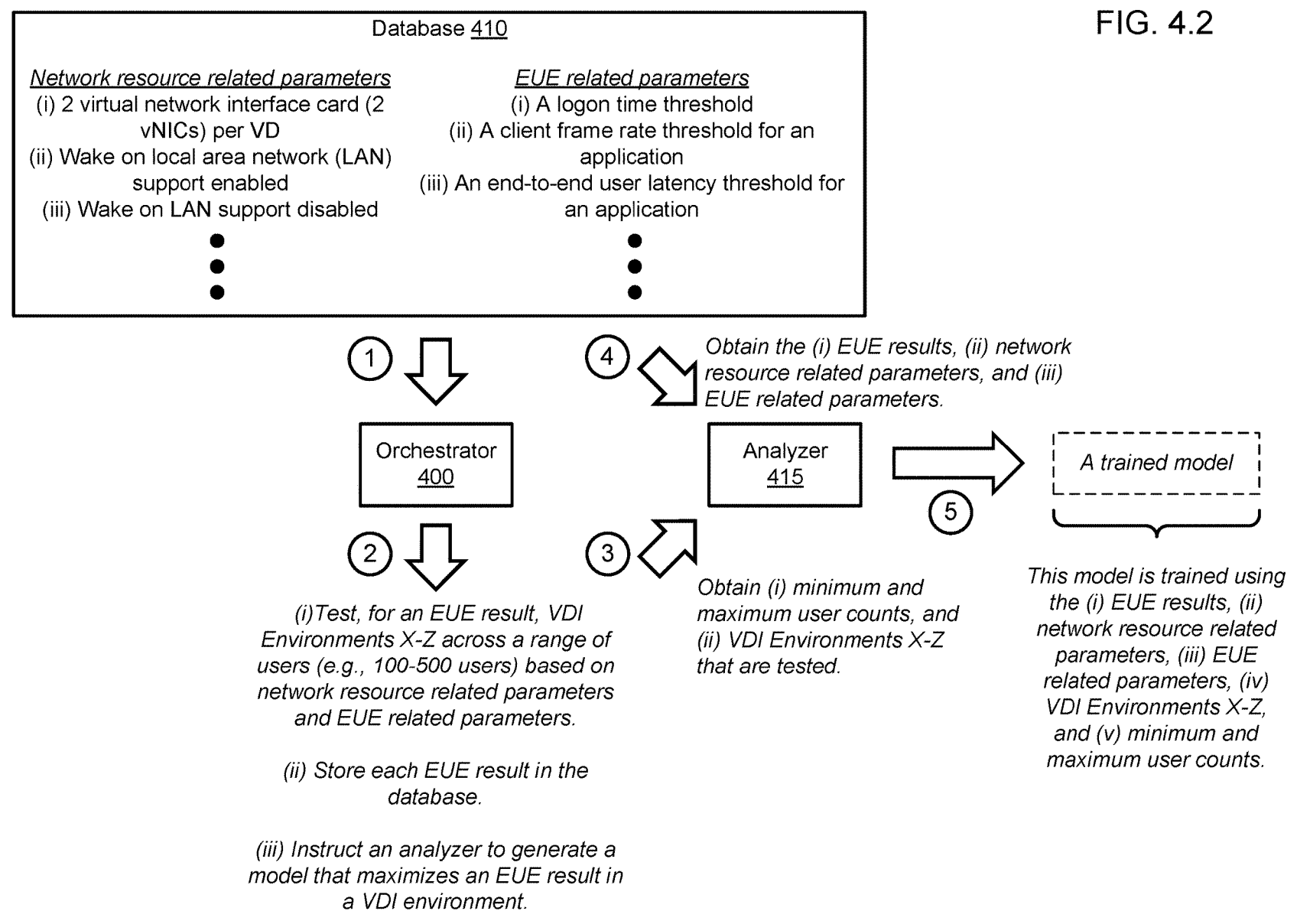

Database 410

*Network resource related parameters*
(i) 2 virtual network interface card (2 vNICs) per VD
(ii) Wake on local area network (LAN) support enabled
(iii) Wake on LAN support disabled

*EUE related parameters*
(i) A logon time threshold
(ii) A client frame rate threshold for an application
(iii) An end-to-end user latency threshold for an application

1

Orchestrator 400

2

*(i)Test, for an EUE result, VDI Environments X-Z across a range of users (e.g., 100-500 users) based on network resource related parameters and EUE related parameters.*

*(ii) Store each EUE result in the database.*

*(iii) Instruct an analyzer to generate a model that maximizes an EUE result in a VDI environment.*

3

*Obtain (i) minimum and maximum user counts, and (ii) VDI Environments X-Z that are tested.*

4

*Obtain the (i) EUE results, (ii) network resource related parameters, and (iii) EUE related parameters.*

Analyzer 415

5

*A trained model*

*This model is trained using the (i) EUE results, (ii) network resource related parameters, (iii) EUE related parameters, (iv) VDI Environments X-Z, and (v) minimum and maximum user counts.*

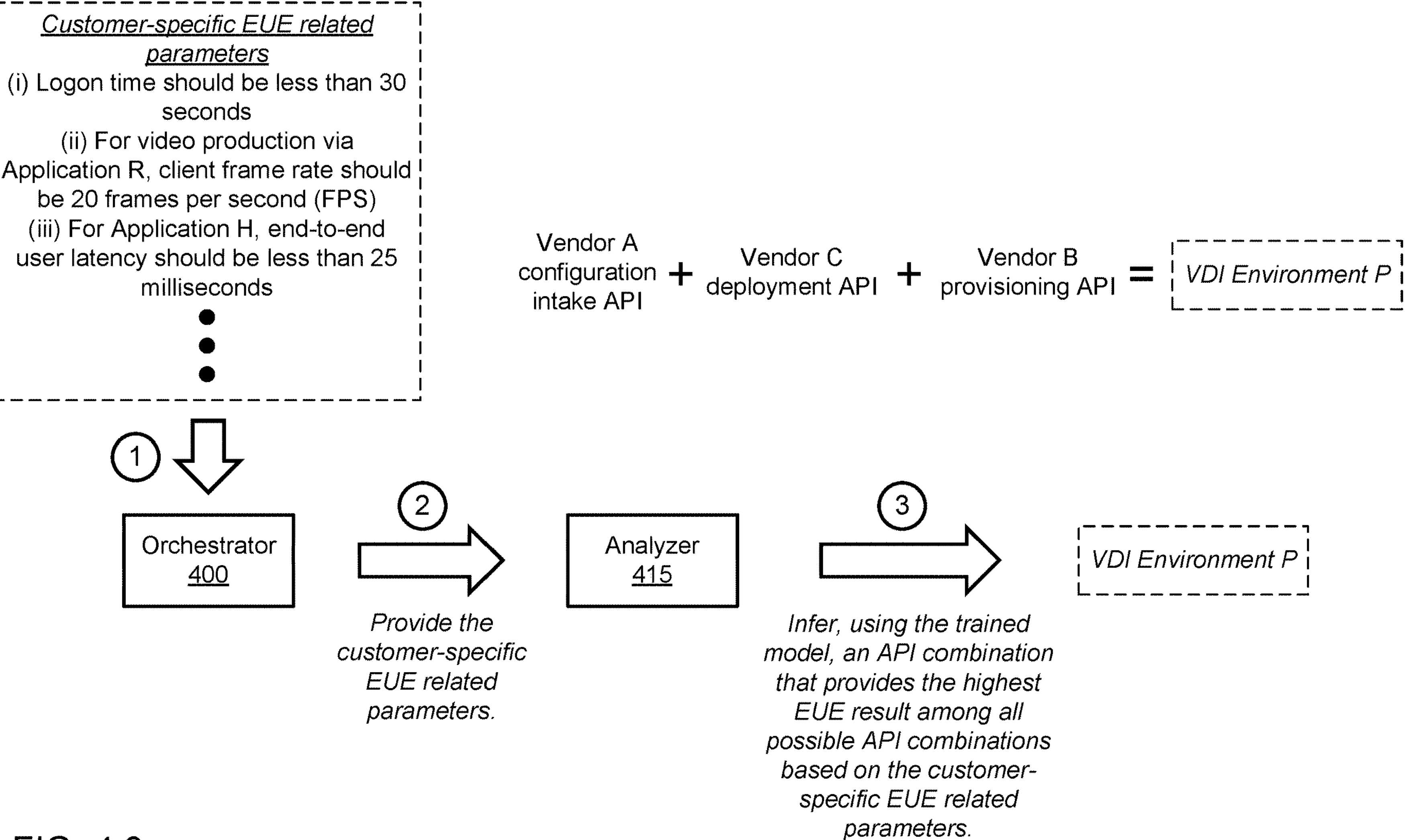
FIG. 4.3

METHOD AND SYSTEM FOR EUE MAXIMIZATION-BASED FLEX ON DEMAND IN A MULTI-API VIRTUAL DESKTOP INFRASTRUCTURE (VDI) ENVIRONMENT

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1 and 3.2 show a method for end-user experience (EUE) maximization-based flex on demand in a multi application programming interface (API) VDI environment in accordance with one or more embodiments of the invention.

FIGS. 4.1-4.3 show an example use case in accordance with one or more embodiments of the invention.

DETAILED DESCRIPTION

Figure 1:
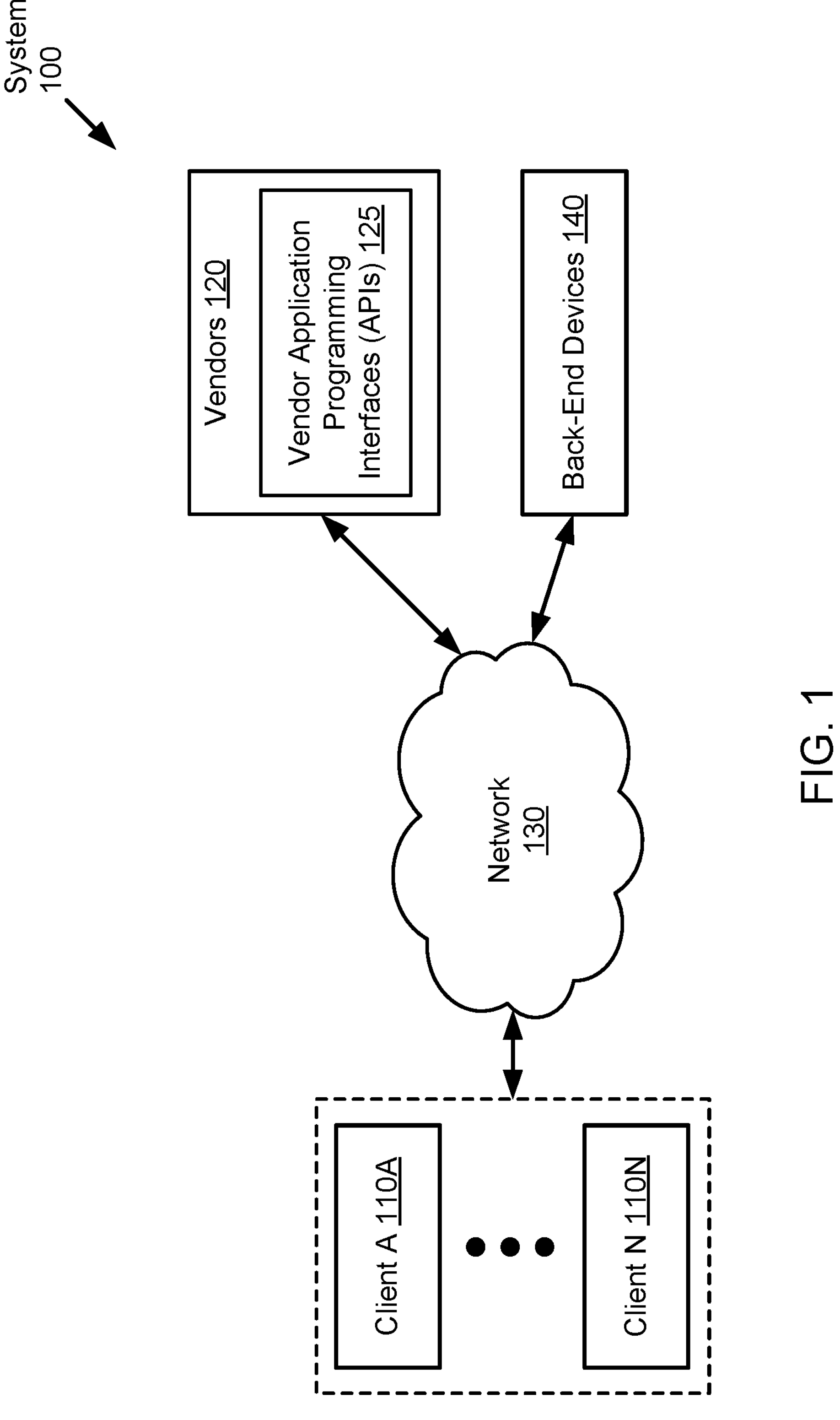
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, service providers (e.g., multi-hybrid cloud providers, as a service (aaS) providers, etc.) in environments (e.g., aaS environments) may have access to multiple different VDI broker (or management) environments from different vendors (e.g., manufacturers, distributors, etc.). This brings the possibility for these service providers of assembling a custom VDI provisioning and management environment based on the combination of disparate capabilities from each of the different VDI environments, in which these disparate capabilities usually being accessed via vendor-provided API calls (or simply "APIs"). In such a scenario, multiple combinations of API calls will typically be capable of providing the required capabilities (e.g., virtual desktop (VD) pool generation, VD provisioning, user profile configuration, image update, VD decommissioning, etc.), and so a service provider and a customer (e.g., a user, an end-user, etc.) may be interested in generating a highly efficient and reliable combination of API calls (e.g., the most "efficient" combination of API calls).

In these "aaS" type environments, "flex on demand" approach may be commonly used, in which customers may get access to additional resources (e.g., computing resources) as needed. A common concern (for organizations) deploying an environment, such as a VDI environment, is satisfying EUE requirements of the users in relation to EUE parameters (e.g., logon time, end-to-end user latency for an application, a client frame rate for an application, client image quality for an application, etc.), which may cause an efficiency problem (to be solved) as to how to assemble (or manage) API calls that maximize the EUE (or the EUE result) in/of the VDI environment to provide the best user experience.

For at least the reason(s) discussed above, without requiring resource (e.g., time, engineering, etc.) intensive efforts to intelligently combine capabilities from multiple different VDI environments to maximize an EUE result in a VDI environment (with a variable user count and different user types), a fundamentally different approach is needed.

Embodiments of the invention relate to methods and systems to assemble/infer an API combination that provides the highest EUE result among all valid/legitimate API combinations/VDI environment configurations (or simply "VDI environments"). More specifically, the embodiments of the invention may first obtain, by an orchestrator, a resource related parameter (RRP) for a resource and an EUE related parameter from a database. The orchestrator may assemble an API combination to generate a VDI environment based on vendor-provided APIs. The orchestrator may then test, for an EUE result, the VDI environment across a range of users based on the RRP and EUE related parameter, in which the EUE result may be stored in the database. Thereafter, the orchestrator may provide the range of users and VDI environment to an analyzer, in which the orchestrator instructs the analyzer to generate a model that maximizes the EUE result in the VDI environment.

Further, the analyzer may generate a trained model by training the model using at least the range of users, VDI environment, EUE related parameter, RRP, and EUE result, in which the RRP, EUE related parameter, and EUE result may be obtained from the database. The orchestrator may then provide a customer-specific EUE related parameter to the analyzer, in which the customer-specific EUE related parameter is received from a customer. The analyzer may infer, via the trained model, a second API combination that provides the highest EUE result among all valid API combinations based on the customer-specific EUE related parameter, in which the API combinations may include at least the API combination and second API combination. Finally, the orchestrator may initiate deployment of a second VDI environment that is generated based on the second API combination, in which the second API combination may be received from the analyzer.

As a result of the processes discussed below, one or more embodiments disclosed herein advantageously ensure that: (i) all of the possible valid/legitimate combinations (or a subset of the valid combinations if there is a need to limit the resource requirements for the API combination selection operation) are used to assemble APIs (i.e., to generate a VDI environment), (ii) based on (i), each combination is load tested via a VDI load-testing tool/device/module (which may employ machine learning (ML)/artificial intelligence (AI) based models/algorithms), for example, with a number of different user counts, user types (e.g., a knowledge worker, a power worker, a task worker with relatively low-end compute requirements, a high-end user that requires a rich multimedia experience, etc.), and EUE related and infrastructure related settings/parameters (e.g., a logon time threshold, a client (e.g., an endpoint, a thin client, a computing device, etc.) frame rate threshold for an application, an end-to-end user latency threshold for an application, client image quality for an application, "type 1" server is selected, "type 2" server is selected, "hyperconverged infrastructure (HCI) 1" is selected, "HCI 2" is selected, etc.), (iii) without requiring resource-intensive efforts, capabilities from multiple VDI environments are combined to maximize an EUE result in a VDI environment with a variable user count, and (iv) after deploying the VDI environment that is assembled in (iii), an actual EUE result in the VDI environment is monitored and obtained to further train the corresponding ML/AI model (with this "real" data) for a better user experience (e.g., based on the monitoring, if necessary, a better (or a second) API combination/VDI environment may be deployed/recommended for the user).

The following describes various embodiments of the invention.

FIG. 1 shows a diagram of a system (100) in accordance with one or more embodiments of the invention. The system (100) includes any number of clients (or front-end devices, endpoint devices, thin clients, etc.) (e.g., Client A (110A), Client B (110B), etc.), any number of vendors (120), any number of back-end devices (140), and a network (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (e.g., 110A, 110B, etc.), the vendors (120), and the back-end devices (140) may be physical or logical devices, as discussed below. While FIG. 1 shows a specific configuration of the system (100), other configurations may be used without departing from the scope of the invention. For example, although the clients (e.g., 110A, 110B, etc.) and the back-end devices (140) are shown to be operatively connected through a communication network (e.g., 130), the clients (e.g., 110A, 110B, etc.) and the back-end devices (140) may be directly connected. As yet another example, although the vendors (120) and the back-end devices (140) are shown be operatively connected through a communication network (e.g., 130), the vendors (120) and the back-end devices (140) may be directly connected.

Further, the functioning of the clients (e.g., 110A, 110B, etc.) and the back-end devices (140) is not dependent upon the functioning and/or existence of the other components (e.g., devices) in the system (100). Rather, the clients (e.g., 110A, 110B, etc.) and the back-end devices (140) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (e.g., 110A, 110B, etc.). The system (100) may also represent a comprehensive middleware layer executing on computing devices (e.g., 500, FIG. 5) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide the aforementioned computer-implemented services to the users, the system (100) may perform some computations (e.g., data collection, distributed processing of collected data, etc.) locally (e.g., at the users' site using the clients (e.g., 110A, 110B, etc.)) and other computations remotely (e.g., away from the users' site using the back-end devices (140)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, the clients (e.g., 110A, 110B, etc.) may be physical or logical computing devices configured for hosting one or more workloads, or for providing a computing environment whereon workloads may be implemented. The clients (e.g., 110A, 110B, etc.) may correspond to computing devices that one or more users use to interact with one or more components of the system (100).

In one or more embodiments, different clients (e.g., 110A, 110B, etc.) may have different computational capabilities. For example, Client A (110A) may have 16 gigabytes (GB) of dynamic random access memory (DRAM) and 1 central processing unit (CPU) with 12 cores, whereas Client N (110N) may have 8 GB of persistent memory (PMEM) and 1 CPU with 16 cores. Other different computational capabilities of the clients (e.g., 110A, 110B, etc.) not listed above may also be taken into account without departing from the scope of the invention.

In one or more embodiments, a client (e.g., 110A, 110B, etc.) may include any number of applications (and/or content accessible through the applications) that provide computer-implemented application services to a user. Applications may be designed and configured to perform one or more functions instantiated by a user of the client (e.g., 110A, 110B, etc.). Examples of an application may include (but not limited to): a word processor, a media player, a web browser, a file viewer, an image editor, etc.

In order to provide application services, each application may host similar or different components. The components may be, for example (but not limited to): instances of databases, instances of email servers, etc. Applications may be executed on one or more clients as instances of the application.

In one or more embodiments, applications may vary in different embodiments, but in certain embodiments, applications may be custom developed or commercial applications that a user desires to execute in a client (e.g., 110A, 110B, etc.). In one or more embodiments, applications may be logical entities executed using computing resources of a client (e.g., 110A, 110B, etc.). For example, applications may be implemented as computer instructions, e.g., computer code, stored on persistent storage of the client (e.g., 110A, 110B, etc.) that when executed by the processor(s) of the client cause the client to provide the functionality of the applications described throughout the application.

In one or more embodiments, while performing, for example, one or more operations requested by a user, applications installed on a client (e.g., 110A, 110B, etc.) may include functionality to request and use physical and logical components/resources of the client. Applications may also include functionality to use data stored in storage/memory resources of the client (e.g., 110A, 110B, etc.). The applications may perform other types of functionalities not listed above without departing from the scope of the invention. In one or more embodiments, while providing application services to a user, applications may store data that may be relevant to the user in storage/memory resources of a client (e.g., 110A, 110B, etc.).

In one or more embodiments, to provide services to the users, the clients (e.g., 110A, 110B, etc.) may utilize, rely on, or otherwise cooperate with the back-end devices (140) (which may be remote to the clients). For example, the clients (e.g., 110A, 110B, etc.) may issue requests to the back-end devices (140) to receive responses and interact with various components of the back-end devices (140). The clients (e.g., 110A, 110B, etc.) may also request data from and/or send data to the back-end devices (140) (e.g., the clients may transmit information to the back-end devices that allows the back-end devices to perform computations, the results of which are used by the clients to provide services to the users). As yet another example, the clients (e.g., 110A, 110B, etc.) may utilize application services provided by the back-end devices (140). When the clients (e.g., 110A. 110B, etc.) interact with the back-end devices (140), data that is relevant to the clients (e.g., 110A, 110B, etc.) may be stored (temporarily or permanently) in the back-end devices (140).

Figure 2:
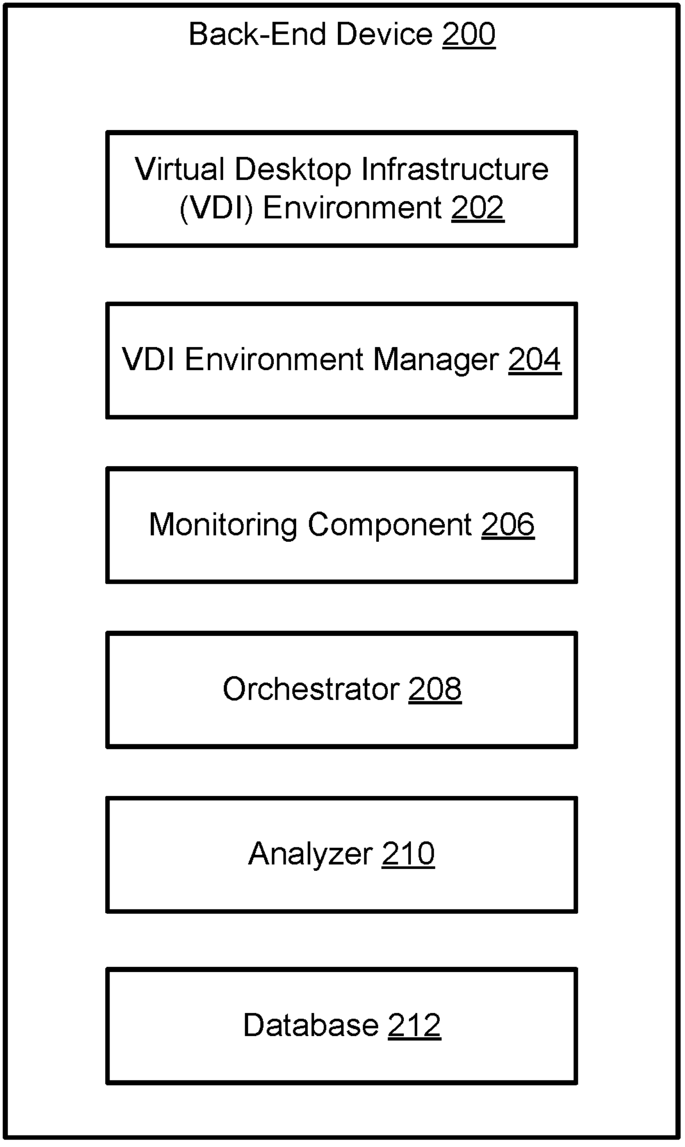
FIG. 2 shows a diagram of a back-end device in accordance with one or more embodiments of the invention.

As yet another example, consider a scenario in which a back-end device of the back-end devices (140) hosts a database (different from the database (212) shown in FIG. 2) utilized by the clients (e.g., 110A, 110B, etc.). In this scenario, the database may be a client database associated with users of the clients (e.g., 110A, 110B, etc.). When a new user is identified, the clients (e.g., 110A, 110B, etc.) may add information of the new user to the client database. By doing so, data that is relevant to the clients (e.g., 110A, 110B, etc.) may be stored in the back-end device. This may be done because the clients (e.g., 110A, 110B, etc.) may desire access to the information of the new user at some point-in-time.

As yet another example, a client of the clients (e.g., 110A, 110B, etc.) may execute an application that interacts with an application database hosted by a back-end device of the back-end devices (140). When an application upgrade is available to fix a critical software issue, the back-end device may identify the client that requires the application upgrade. The application database may then provide the application upgrade to the client. By doing so, the application executed by the client may be kept up-to-date. As yet another example, the clients (e.g., 110A, 110B, etc.) may send instructions to the back-end devices (140) to configure one or more VMs hosted by the back-end devices. In one or more embodiments, instructions may be, for example (but not limited to): instructions to configure a backup policy, instructions to take a snapshot of VM data, etc.

As yet another example, a client of the clients (e.g., 110A, 110B, etc.) may initiate an application to execute on a back-end device of the back-end devices (140) such that the application may (itself) gather, transmit, and/or otherwise manipulate data located in the back-end device, remote to the client. In one or more embodiments, the clients (e.g., 110A. 110B, etc.) may share access to more than one back-end device and may similarly share any data located in those back-end devices.

In one or more embodiments, to provide a consistent user experience to a user, the clients (e.g., 110A, 110B, etc.) may implement virtualized (or virtual) desktop infrastructure (VDI) environment or other types of computing environments that enable remote resources (e.g., the back-end devices (140)) to provide computer-implemented services that appear to the user to be provided by the clients. Said another way, the back-end devices (140) may facilitate VDI functionalities of the clients (e.g., 110A, 110B, etc.), in which the back-end devices (140) may perform computations on behalf of the VDI environment(s) implemented/used by the clients and provide the results of the computations to the clients. By doing so, the clients (e.g., 110A, 110B, etc.) may be able to provide functionalities that would otherwise be unavailable due to the lack of computing resources and/or software implemented functionalities of the clients.

In this manner, the clients (e.g., 110A, 110B, etc.) may be capable of, e.g.,: (i) collecting users' inputs, (ii) correlating collected users' inputs to the computer-implemented services to be provided to the users, (iii) communicating with the back-end devices (140) that perform computations necessary to provide the computer-implemented services, (iv) using the computations performed by the back-end devices (140) to provide the computer-implemented services in a manner that appears (to the users) to be performed locally to the users, and (v) communicating with any VD in a VDI environment of a back-end device (using any known protocol in the art), for example, to exchange remote desktop traffic or any other regular protocol traffic (so that, once authenticated, users may remotely access independent VDs (which may accommodate customized settings) via the corresponding client(s)).

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

In one or more embodiments, the clients (e.g., 110A, 110B, etc.) may provide computer-implemented services to users (and/or other computing devices such as, for example, other clients or other types of components). The clients (e.g., 110A, 110B, etc.) may provide any quantity and any type of computer-implemented services (e.g., data storage services, electronic communication services, etc.). To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), PMEM, virtualized storage, virtualized memory, etc.

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (e.g., 110A, 110B, etc.) provide computer-implemented services to users, the clients (e.g., 110A, 110B, etc.) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., service level agreements (SLAs)) with providers (e.g., the vendors (120)) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., other clients, the back-end devices (140), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP). Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients. For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM (described below), a container (described below), a virtual CPU (vCPU), a virtual storage pool, etc.

In one or more embodiments, a virtualization resource may include a hypervisor (e.g., a VM monitor, described below), in which the hypervisor may be configured to orchestrate an operation of, for example, a VM by allocating computing resources of a client to the VM.

Figure 5:
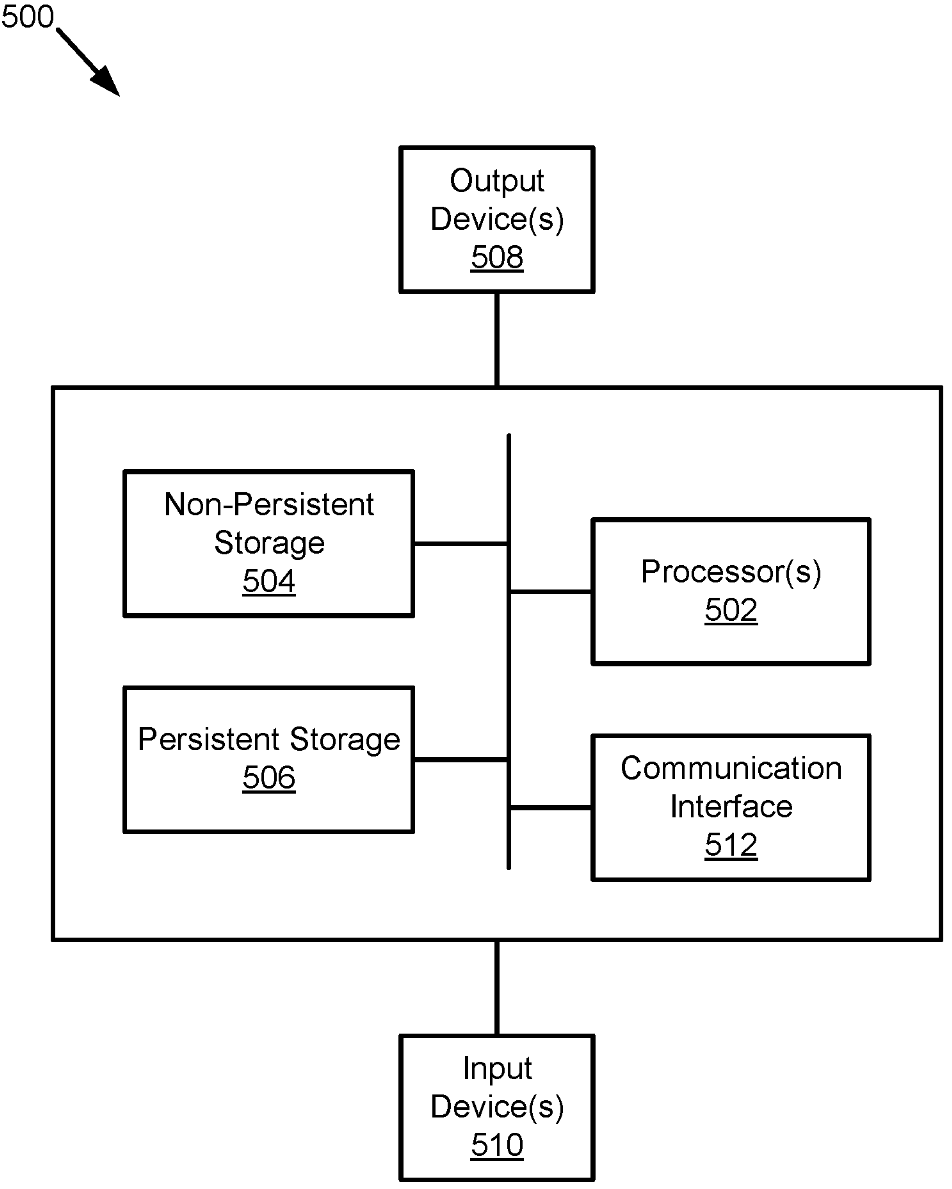
FIG. 5 shows a diagram of a computing device in accordance with one or more embodiments of the invention.

In one or more embodiments, the clients (e.g., 110A, 110B, etc.) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (e.g., 110A, 110B, etc.) described throughout the application.

Alternatively, in one or more embodiments, the clients (e.g., 110A, 110B, etc.) may be implemented as logical devices. The logical devices may utilize the computing resources of any number of computing devices to provide the functionality of the clients (e.g., 110A, 110B, etc.) described throughout this application.

In one or more embodiments, users may interact with (or operate) the clients (e.g., 110A, 110B, etc.) in order to perform work-related tasks (e.g., production workloads). In one or more embodiments, the accessibility of users to the clients (e.g., 110A, 110B, etc.) may depend on a regulation set by an administrator of the clients (e.g., 110A, 110B, etc.). To this end, each user may have a personalized user account that may, for example, grant access to certain data, applications, and computing resources of the clients (e.g., 110A, 110B, etc.). This may be realized by implementing the "virtualization" technology (discussed above). In one or more embodiments, an administrator may be a user with permission (e.g., a user that has root-level access) to make changes on the clients (e.g., 110A, 110B, etc.) that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, a data center (not shown) may be configured for hosting the back-end devices (140) and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, the data center of an organization may exchange data with other data centers of the same organization registered in/to the network (130) in order to, for example, participate in a collaborative workload placement. As yet another example, the data center may split up a request (e.g., an operation, a task, an activity, etc.) with another data center, coordinating its efforts to complete the request (e.g., to generate a response) more efficiently than if the data center had been responsible for completing the request. One of ordinary skill will appreciate that the data center may perform other functionalities without departing from the scope of the invention.

In one or more embodiments, the data center may be capable of providing a range of functionalities/services to the user of the clients (e.g., 110A, 110B, etc.). However, not all of the users may be allowed to receive all of the services. To manage the services provided to the users of the clients (e.g., 110A, 110B, etc.), a system (e.g., a service manager) in accordance with embodiments of the invention may manage the operation of the network (130), in which the clients are operably connected to the back-end devices (140).

Specifically, the service manager (i) may identify services to be provided by the back-end devices (140) (for example, based on the number of users using the clients (e.g., 110A, 110B, etc.)) and (ii) may limit communications of the clients (e.g., 110A, 110B, etc.) to receive back-end devices (140) provided services. For example, the priority (e.g., the user access level) of a user may be used to determine how to manage computing resources (e.g., of the back-end devices (140)) within the data center to provide services to that user. As yet another example, the priority of a user may be used to identify the services that need to be provided to that user. As yet another example, the priority of a user may be used to determine how quickly communications (for the purposes of providing services in cooperation with the network (130) (and its subcomponents)) are to be processed by the network (130).

Further, consider a scenario where a first user is to be treated as a normal user (e.g., a user with a user access level/tier of 4/10). In such a scenario, the user level of that user may indicate that certain ports (of the subcomponents of the network (130) corresponding to communication protocols such as TCP, UDP, etc.) are to be opened, other ports are to be blocked/disabled so that (i) certain services are to be provided to the user by the back-end devices (140) (e.g., while the back-end devices (140) may be capable of performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110B, etc.) may be granularly configured without modifying the operation(s) of the clients (for example, a VDI environment may have predetermined levels of customization) and (ii) the overhead for managing the services of the clients may be reduced by not requiring modification of the operation(s) of the clients directly.

In contrast, a second user may be determined to be a high priority user (e.g., a user with a user access level of 9/10). In such a case, the user level of that user may indicate that more ports are to be opened than were for the first user so that (i) the back-end devices (140) may provide more services to the second user and (ii) network traffic from that user is to be afforded a high level of quality (e.g., a higher processing rate than the traffic from the normal user).

As used herein, a “workload” is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), an application executable or code, an application configuration, a hardware resources configuration, a supporting services configuration, a network connectivity configuration, etc.

As used herein, a “policy” is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term “backup” is intended to be broad in scope. In this manner, example backups in connection with which embodiments of the invention may be employed include (but not limited to): full backups, partial backups, clones, snapshots, incremental backups, differential backups, etc.

As used herein, a “rule” is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an “SLA” between, for example, a vendor of the vendors (120) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a “container” is an executable unit of software in which an application code is packaged, along with its libraries and dependencies, so that it can be executed anywhere. To do this, a container takes advantage of a form of OS virtualization in which features of the OS are leveraged to both isolate processes and control the portion of a CPU, memory, and a disk that those processes have access to.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, as being a physical computing device or a logical computing device (e.g., a VM), a back-end device of the back-end devices (140) may be configured for, e.g.,: (i) hosting and maintaining various workloads, (ii) providing computer-implemented services (e.g., receiving a request, sending a response to the request, etc.) to the clients (e.g., 110A, 110B, etc.), in which the clients may access the computer-implemented services via one or more VDI environments (or other types of computing environments whereon workloads may be implemented) hosted by the back-end device, (iii) exchanging data with other components registered in/to the network (130) in order to, for example, participate in a collaborative workload placement, (iv) dynamically controlling the computer-implemented services provided by the clients (e.g., 110A, 110B, etc.) (for example, when a VDI environment hosted/used by a client, the client may provide a range of different computer-implemented services via the corresponding back-end device), and (v) operating as a standalone device. One of ordinary skill will appreciate that the back-end device may perform other functionalities without departing from the scope of the invention.

A back-end device of the back-end devices (140) may split up a request with another component of the system (100), coordinating its efforts to complete the request (e.g., to generate a response) more efficiently than if the back-end device had been responsible for completing the request. In one or more embodiments, a request may be, for example (but not limited to): a web browser search request, a representational state transfer (REST) request, a computing request, a database management request, a registration request, a file upload/download request, etc. In one or more embodiments, the back-end device may be a heterogeneous set, including different types of hardware components and/or different types of OSs.

In one or more embodiments, a back-end device of the back-end devices (140) may host any number of applications (and/or content accessible through the applications) that provide application services to the clients (e.g., 110A, 110B, etc.). Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial applications that a user desires to execute in the back-end device. In one or more embodiments, applications may be logical entities executed using computing resources of the back-end device. For example, applications may be implemented as computer instructions, e.g., computer code, stored on persistent storage of the back-end device that when executed by the processor(s) of the back-end device cause the back-end device to provide the functionality of the applications described throughout the application.

In one or more embodiments, while performing, for example, one or more operations requested by a user of a client of the clients (e.g., 110A, 110B, etc.), applications installed on the back-end device may include functionality to request and use resources (e.g., data, computing resources, etc.) of the back-end device. Applications may also perform other types of functionalities not listed above without departing from the scope of the invention. In one or more embodiments, while providing application services to a user, applications may store (temporarily or permanently) data that may be relevant to the user in persistent storage of the back-end device.

In one or more embodiments, a back-end device of the back-end devices (140) may include any number of VMs to execute one or more VDI environments so that, for example, the back-end devices (140) may host the above-discussed applications and provide remove computer-implemented services. A VM may be a logical entity (e.g., a computer program) executed using the physical and logical components of the back-end device, or using computing resources of other computing devices connected to the back-end device. Specifically, a VM may be a computer program that emulates a physical computing system and, thus, provides a self-contained execution environment on which one or more other computer programs (e.g., guest OSs, applications, workloads (e.g., a characterization of the work and/or tasks that a VM performs), etc.) may execute.

Further, a VM may access the underlying back-end device hardware and interact with other components using an abstraction layer, e.g., a hypervisor. In one or more embodiments, each of the VMs may perform similar or different processes. In one or more embodiments, the VMs (and applications hosted by the VMs) may generate data (e.g., VM data) that is stored in the persistent storage of the back-end device, in which the VM data may reflect a state of a VM.

In one or more embodiments, VMs may provide services (e.g., application services) to the clients (e.g., 110A, 110B, etc.). For example, VMs may host instances of databases, email servers, and/or other applications that are accessible to the clients (e.g., 110A, 110B, etc.). The VMs may host other types of components not listed above without departing from the scope of the invention.

In one or more embodiments, a back-end device of the back-end devices (140) may include a hypervisor. The hypervisor may be configured to orchestrate the operation of the VMs. Thus, the hypervisor may include functionality to, for example (but not limited to): generate or delete a VM, allocate or deallocate host (i.e., back-end device) resources to support the execution of a VM and the VM's respective workloads, manage an internal communication (e.g., a request from a VM to any other back-end device component, a request from any other back-end device component to a VM, etc.) between a VM and one or more other back-end device components, etc.

In one or more embodiments, the hypervisor may be a physical device including circuitry, for example (but not limited to): a field-programmable gate array, an ASIC, a programmable processor, a microcontroller, a digital signal processor, etc. The physical device may be adapted to provide the functionality of the hypervisor described throughout the application. Alternatively, similar to the VMs, the hypervisor may also be implemented as computer instructions.

In one or more embodiments, a back-end device of the back-end devices (140) may include functionality to: (i) consolidate multiple data process or protection requests (received from, for example, the clients (e.g., 110A, 110B, etc.)) so that duplicative operations (which may not be useful for restoration purposes) are not generated, and (ii) initiate multiple data process or protection operations in parallel. For example, a production agent (of the back-end device) may host multiple operations. Each of the multiple operations may (a) manage the initiation of a respective operation and (b) operate concurrently to initiate multiple operations.

In one or more embodiments, in order to provide the above-mentioned functionalities, a back-end device of the back-end devices (140) may need to communicate with other components of the system (100) with minimum amount of latency (e.g., with high-throughput (e.g., a high data transfer rate) and sub-millisecond (sub-ms) latency). For this reason, REST APIs may be used to enable communication(s) between the back-end device and the other components.

As used herein, a VDI environment refers to a system of providing complete, centrally-managed VD computing systems to users using computer virtualization technology (or desktop virtualization technology) that executes one or more desktop OSs (e.g., an environment through which a user controls a computing device (e.g., 500, FIG. 5)). In most cases, a VDI environment is used to generate relatively large numbers of independent VD computing environments for relatively large numbers of users, with the users grouped together based on similar software and computing needs. For example, consider a scenario where a client of the clients (e.g., 110A, 110B, etc.) is implemented as a tablet computer. The tablet computer may have limited computing resources preventing it from substantively processing data. However, the tablet computer may implement a VDI environment which allows it to perform substantive data processing using the computing resources of other devices.

In one or more embodiments, the users of the clients (e.g., 110A, 110B, etc.) may access an image of a desktop OS (e.g., a VD image) remotely over the network (130). Said another way, each VD's computing system may be exported to the corresponding user from the corresponding VM. In this manner, the users may interact with the desktop OS (including its applications) as if it was executing locally on the clients (e.g., 110A, 110B, etc.).

In one or more embodiments, the clients (e.g., 110A, 110B, etc.) may utilize network connectivity established by a VDI environment to perform distributed computation of collected data using the back-end devices (140). When a VDI environment is established, the VDI environment may setup any number of VDI connections for the purposes of performing various functionalities of the VDI environment. For example, the VDI environment may establish a connection (e.g., a connection supporting a display protocol) over which graphics interfaces are transmitted (e.g., generated by a back-end device and displayed by a client).

In one or more embodiments, a VD image may refer to a preconfigured image of a desktop OS, in which the desktop environment is separated from the computing device (e.g., 500, FIG. 5) used to access it. In one or more embodiments, the accessibility of the users to the VD image (also referred to herein simply as "VD") may depend on a configuration set by an administrator.

In one or more embodiments, for example, the users may be automatically directed to a login screen of the VD when they are connected to the corresponding VDI environment over the network (130). In this scenario, the VD may only be allocated to a specific user (via a VD identifier (not shown)). As yet another example, the users may need to select a VD from a combination of VDs (e.g., a VD pool) to launch when they are connected to the VDI environment over the network (130). In this scenario, the users may have access to all of the VDs in the VD pool.

In one or more embodiments, once the login screen of a VD is displayed, a user accessing the VD may enter the user's credentials on the login screen. The login screen may be a GUI generated by a visualization module (not shown) of the corresponding back-end device. In one or more embodiments, the visualization module may be implemented in hardware, software, or any combination thereof.

In one or more embodiments, once the user has logged into the VD, the user may select one or more applications (e.g., computer programs) and/or may start performing one or more operations (e.g., functions, tasks, activities, etc.) available on the VD. Examples of the applications may include, but are not limited to: a word processor, a media player, a web browser, a file viewer, an image editor, etc.

In one or more embodiments, the applications installed on the VDs may include functionality to request and use each VD's computing resources (and computing subordinate resources) (e.g., CPU, networking resource, memory, GPU, DPU, storage (or storage space), storage input/output (I/O), etc.). Additional details regarding the computing resources of the VDs utilized by the applications are described below in reference to FIG. 2.

In one or more embodiments, to be able to provide computer-implemented services (via the VDI environment (s)) to the users of the clients (e.g., 110A, 110B, etc.), the back-end devices (140) may need to install/execute a corresponding client application (e.g., a remote desktop protocol (RDP) application, an enlightened data transport (EDT) application, etc.), or may need to execute a hypertext markup language (e.g., HTML version 5) based session to initiate an RDP. The RDP may be, for example (but not limited to): an independent computing architecture (ICA) protocol, an EDT protocol, a Blast protocol, a personal computer over Internet protocol (PCoIP), etc.

In one or more embodiments, an RDP may control the clients' (e.g., 110A, 110B, etc.) multimedia capabilities (e.g., display, audio, video, etc.) via a multimedia engine (not shown). For example, the multimedia engine may control a display of a client of the clients (e.g., 110A, 110B, etc.) such that a status of an application executing on the corresponding VD may be displayed in real-time (e.g., on the order of ms or less) to a user of the client. The status may be displayed in any visual format that would allow the user to easily comprehend the listed information. In one or more embodiments, the multimedia engine may be operatively connected to the clients (e.g., 110A, 110B, etc.). The multimedia engine may be implemented using hardware, software, or any combination thereof.

Further, an RDP may compress data that is transmitted to and from a client of the clients (e.g., 110A, 110B, etc.) for a better user experience (e.g., for reduced latency). For example, consider a scenario in which a user of the client may operate on a spreadsheet (e.g., an application where data may be analyzed and stored in a tabular form). In this scenario, the client may transmit user input (e.g., mouse movements, keystrokes, etc.) to the corresponding VD, and, in response, bitmaps (e.g., a format to store computing device-independent and application-independent images) may be transmitted back to the client. More specifically, the data itself (e.g., the payload) may not be populated to the user display; instead, the user display may show bitmaps that represent the data. When the user enters additional data into the spreadsheet, the client may only transmit the updated bitmaps.

In one or more embodiments, in the above-discussed scenario, the RDP may use a robust header compression (ROHC) approach to compress a header of the protocol. For example, the ROHC approach may compress 40 bytes of IP version 4 (IPv4) header into byte (by employing a linear, non-linear, and/or ML-based data compression model). In one or more embodiments, the header of the protocol may include, for example (but not limited to): a sequence number of a data packet (e.g., a small amount of data transmitted over the network (130)), IP information of a targeted destination, a pointer to verify the status of a transmitted data packet, etc.

One of ordinary skill will appreciate that a back-end device of the back-end devices (140) may perform other functionalities without departing from the scope of the invention. In one or more embodiments, the back-end device may be configured to perform all, or a portion, of the functionalities described in FIGS. 3.1 and 3.2. Additional details of the back-end device are described below in reference to FIG. 2.

In one or more embodiments, the back-end devices (140) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the back-end devices (140) described throughout this application.

Alternatively, in one or more embodiments, similar to the clients (e.g., 110A, 110B, etc.), the back-end devices (140) may also be implemented as logical devices.

In one or more embodiments, the network (130) (or the "network environment") may represent a computing network and/or fabric configured for computing resource and/or messages exchange among registered computing devices (e.g., the clients (e.g., 110A, 110B, etc.), the back-end devices (140), etc.). As discussed above, components of the system (100) may operatively connect to one another through the network (130) (e.g., a storage area network (SAN), a personal area network (PAN), a local area network (LAN), a metropolitan area network (MAN), a wide area network (WAN), a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network (130) may be operably connected to the Internet or other networks. Further, the network (130) may enable interactions between, for example, the clients (e.g., 110A, 110B, etc.) and the back-end devices (140) through any number and type of wired and/or wireless network protocols (e.g., TCP, UDP, IPv4, etc.). Further, the network (130) may be configured to perform all, or a portion, of the functionality described in FIGS. 3.1 and 3.2.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network (130), and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time network traffic and non-real-time network traffic should be managed in the network (130). In one or more embodiments, the real-time network traffic may be high priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, when the clients (e.g., 110A, 110B, etc.) communicate with the back-end devices (140) over the network (130), the clients (e.g., 110A, 110B, etc.) may transmit data structures (e.g., lists, tables, etc.) having a predetermined format in accordance with a communication protocol implemented by the clients (e.g., 110A, 110B, etc.), the network (130), and/or the back-end devices (140).

As described above, when providing different types of computer-implemented services, the clients (e.g., 110A, 110B, etc.) may communicate with the back-end devices (140) using different ports (e.g., file transfer protocol (FTP) port 20, network time protocol (NTP) port 123, etc.). Consequently, different functionalities of the services provided by the clients (e.g., 110A, 110B, etc.) may be dependent on being able to communicate with the back-end devices (140) via different ports. If such communications are made inoperable, then the clients (e.g., 110A, 110B, etc.) may be prevented from providing functionalities of the services corresponding to the respective ports.

In one or more embodiments, the vendors (120) may refer to any party such as manufacturers or distributors of multiple different VDI broker (or management) environments to, for example, service providers. In one or more embodiments, VDI brokers (or VDI connection brokers) may be used (by the service providers (e.g., the back-end devices (140))) to generate one or more VD instances, in which, for example, an administrator may use a VDI environment to segment one or more servers into VDs and users may remotely access their respective VDs.

A vendor of the vendors (120) may include functionality to, e.g.,: (i) host one or more vendor-provided APIs (e.g., vendor software, Microsoft® PowerShell scripts, protocol information, non-protocol information, web APIs that may be accessed through assigned web addresses (e.g., uniform resource locators (URLs)) and Internet connection, etc.) (described below), (ii) interact with the back-end devices (140) through, for example, the submission of web API requests and the receiving of corresponding web API responses, (iii) receive API requests from the back-end devices (140), (iv) based on (iii), process API requests to obtain request-pertinent arguments therefrom, (v) based on (iv), provide the obtained request-pertinent arguments to an internal or external agent (not shown), (vi) based on (v), obtain request-pertinent results from the internal or external production agent, (vii) based on (vi), encode the obtained request-pertinent results to generate API responses, (viii) based on (vii), provide API responses to the back-end devices (140), (ix) provide recommended APIs to an orchestrator (e.g., 208, FIG. 2) so that the orchestrator may assemble proper API combinations (based on the vendor-recommended APIs) to generate different VDI environments (because, for example, the multiplicity of existing APIs may generate significant complexity for the orchestrator while requesting/querying APIs), and (x) provide the possibility (for the back-end devices (140)) of assembling a custom VDI provisioning and management environment based on the combination of disparate capabilities from different VDI environments, in which these disparate capabilities usually being accessed using vendor-provided APIs (e.g., 125).

In one or more embodiments, the vendor-provided APIs (or vendor APIs (125)) may include, for example (but not limited to): a configuration intake API (e.g., Vendor 2 configuration intake APIs (e.g., vendor_2_desktop count), Vendor 3 configuration intake APIs (e.g., vendor_3_desktop count), etc.), a provisioning API (e.g., Vendor 1 provisioning APIs (e.g., vendor_1_make_clones), Vendor 2 provisioning APIs (e.g., vendor_2_make_clones), etc.), a deployment API (e.g., Vendor 2 deployment APIs (e.g., vendor_2_deploy_pool), Vendor 3 deployment APIs (e.g., vendor_3_deploy_pool), etc.), a lifecycle management (e.g., an image update) API (e.g., Vendor 2 lifecycle management APIs (e.g., vendor_2_replace_gold_image), Vendor 3 lifecycle management APIs (e.g., vendor_3_replace_gold_image), etc.), a decommissioning API (or a VD decommissioning API) (e.g., Vendor 2 decommissioning APIs (e.g., vendor_2_remove_pool_from_catalogue), Vendor 3 decommissioning APIs (e.g., vendor_3_remove_pool_from_catalogue), etc.), etc. In one or more embodiments, each vendor of the vendors (120) may include an API interface to provide one or more capabilities via the aforementioned APIs (or API calls).

In one or more embodiments, an API may be a hardware and/or software implemented construct that employs a set of subroutine definitions, protocols, and/or tools for enabling communications and/or information exchange between, for example, the back-end devices (140) and the vendors (120). In one or more embodiments, multiple combinations of APIs will typically be capable of providing the required capabilities (e.g., VD pool generation, desktop provisioning (e.g., setting up a VD and making the VD available to users, and managing access to its data and resources), user profile configuration, image update, VD decommissioning, etc.) such that a back-end device may generate the most "efficient" combination of APIs for a user.

One of ordinary skill will appreciate that the vendors (120) may perform other functionalities without departing from the scope of the invention. Each vendor of the vendors (120) may include a production agent that performs the aforementioned functionalities. The agent may be implemented using hardware, software, or any combination thereof.

Turning now to FIG. 2, FIG. 2 shows a diagram of a back-end device (200) in accordance with one or more embodiments of the invention. The back-end device (200) may be an example of a back-end device discussed above in reference to FIG. 1. The back-end device (200) may include a VDI environment (202), a VDI environment manager (204), a monitoring component (206), an orchestrator (208), an analyzer (210), and a database (212). The back-end device (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the back-end device (200) may include a frame (not shown) and any number of chassis (not shown). The frame may be a mechanical structure that enables chassis to be positioned with respect to one another. For example, the frame may be a rack mount enclosure that enables chassis to be disposed within it. The frame may be implemented as other types of structures adapted to house, position, orient, and/or otherwise physically, mechanically, electrically, and/or thermally manage chassis. By managing the chassis, the frame may enable multiple chassis to be co-located.

In one or more embodiments, a chassis may be a mechanical structure for housing at least the aforementioned components of the back-end device (200). For example, a chassis may be implemented as a rack mountable enclosure for housing the aforementioned components of the back-end device (200). The chassis may be adapted to be disposed within the frame.

In one or more embodiments, the VDI environment (202) may include any number of VDs (or VD instances that may operate on a physical server that may have been partitioned into several virtual servers), in which VDs (e.g., a VD pool) are the virtualized equivalents of computing devices (e.g., 500, FIG. 5) that users login to perform production workloads. In one or more embodiments, the VDI environment (202) may be configured as a server platform/environment or an HCI environment including one or more HCIs (i.e., software-defined systems that combine/integrate all elements including storage, virtualization, compute, networking, and management of a data center into a single solution, in which the solution may take form as a software stack, a hardware appliance, or a combination thereof).

In one or more embodiments, the VDI environment (202) may provide any quantity and any type of computer-implemented services (e.g., compute services, storage services, electronic communication services, etc.) to users of the clients (e.g., 110A, 110B, etc., FIG. 1). To provide computer-implemented services, the VDI environment (202) may execute a collection of logical components (or computing resources) (e.g., processing resources (e.g., vCPUs, virtual GPUs (vGPUs), etc.), storage/memory resources, networking resources, virtualization resources, etc.).

In one or more embodiments, the VDI environment (202) may be managed/operated by an administrator (e.g., an individual (or a group of individuals) using VDI management software/tool to provision VDs and perform various management functions) or the VDI environment manager (204) (discussed below) that may be responsible for overseeing operations and maintenance pertinent to the hardware, software, and/or firmware elements of the VDI environment (202).

One of ordinary skill will appreciate that the VDI environment (202) may perform/provide other functionalities without departing from the scope of the invention. When providing its functionalities, the VDI environment (202) may perform all, or a portion, of the methods illustrated in FIGS. 3.1 and 3.2. The VDI environment (202) may be implemented using hardware, software, or any combination thereof.

In one or more embodiments, the VDI environment manager (204) may include functionality to, e.g.,: (i) generate all of the housekeeping for the VDI environment (202) (e.g., deploying/establishing VDs (e.g., VD instances, VMs, any number of methodologies (e.g., server-based computing) where users share the desktop of a server-based OS through their own VMs (typically executing a user-based OS), etc.), managing one or more VD pools, decommissioning VDs (including VD pools), managing the execution of operations on VDs (e.g., managing services to be provided by a VD based on the validity and user level of a user, managing workload placement among VDs, tracking VD capabilities and resource availabilities, etc.), associating a VD pool with a master image, managing VD state policies, etc.), (ii) include capabilities provided by different vendors (e.g., 120, FIG. 1) through, for example, vendor-provided APIs, (iii) execute any computer-readable program code, firmware/software, hardware, or combinations thereof that helps to generate VDs being executed on the VDI environment (202), (iv) execute computing system virtualization application(s) that may be accessed by the clients (e.g., 110A, 110B, etc., FIG. 1), (v) execute any computer-readable program code that connects the clients (e.g., 110A, 110B, etc., FIG. 1) to VD instances, (vi) be responsible for the authentication of users of the clients (e.g., 110A, 110B, etc., FIG. 1) and direct those users to their respective VD instances, (vii) keep track of (in conjunction with the monitoring component (206)) active and inactive VDs (e.g., when a user sends a request to connect to a VD, the VDI environment manager (204) may provide the user with an idle VD; when a user disconnects from a given VD, the VDI environment manager (204) may update the status (of the VD) to an "inactive" state), (viii) provide a remotely-accessible user interface to an administrator to manage the configuration of VD pools (e.g., a management terminal displayed on the VDI environment manager (204) may allow an administrator to perform one or more computing system virtualization management functions via a secure management session), (ix) control the lifecycle of VDs executing on the VDI environment (202) (said another way, executing on the back-end device (200)), (x) perform power operations on VDs (i.e., power on, power-off, suspend, resume, checkpoint, etc.), (xi) group two or more VDs to generate one or more VD pools, (xii) allocate resources (or computing resources) available in the VDI environment (202) to generate one or more VD pools, (xiii) migrate (when necessary) one or more VDs to another VD pool (e.g., when one of the VDs requires access to more network access, that VD may be migrated to another VD pool with a higher network BW), (xiv) prevent unauthorized access events directed to the VDI environment (202), (xv) perform hot storage migration in which VD disks are migrated during operation of the relevant VD. (xvi) provide an out-of-band communication channel to applications executing on a VD, (xvii) monitor/aggregate/track (in conjunction with the monitoring component (206)) various performance and health (e.g., operation condition) information of each VD exists in the VDI environment (202), and (xviii) store (temporarily or permanently) information/data related to (i)-(xvii) in the database (212) (e.g., the back-end device repository).

One of ordinary skill will appreciate that the VDI environment manager (204) may perform other functionalities without departing from the scope of the invention. When providing its functionalities, the VDI environment manager (204) may perform all, or a portion, of the methods illustrated in FIGS. 3.1 and 3.2. The VDI environment manager (204) may be implemented using hardware, software, or any combination thereof.

In one or more embodiments, the monitoring component (206) may include functionality to, e.g.,: (i) monitor/aggregate/track (in conjunction with the VDI environment manager (204)) various health information of each VD exists in the VDI environment (202), (ii) keep track of (in conjunction with the VDI environment manager (204)) active and inactive VDs, (iii) monitor the utilization/performance of VDs (with respect to, for example, logon time, end-to-end user latency for an application, a client frame rate for an application, client image quality for an application, network latency, etc.) through its, for example, local monitoring agent and/or remote monitoring agent (i.e., a monitoring agent that is deployed to the corresponding client (e.g., 110A, 110B, etc., FIG. 1)) to obtain/collect/assess an EUE result in the corresponding VDI environment (for example, to infer whether the corresponding VDI environment satisfies or fails to satisfy an EUE threshold (or EUE requirements set by the customer (see Step 326 of FIG. 3.2)) over a monitoring time interval), and (iv) store (temporarily or permanently) information/data related to (i)-(iii) in the database (212).

One of ordinary skill will appreciate that the monitoring component (206) may perform other functionalities without departing from the scope of the invention. When providing its functionalities, the monitoring component (206) may perform all, or a portion, of the methods illustrated in FIGS. 3.1 and 3.2. The monitoring component (206) may be implemented using hardware, software, or any combination thereof.

In one or more embodiments, the orchestrator (208) may include functionality to, e.g.,: (i) obtain (or discover) resource related parameters (described below) for resources and EUE related parameters (described below) from the database (212), (ii) obtain (or call) different APIs (e.g., 125, FIG. 1) from the vendors (e.g., 120, FIG. 1), (iii) assemble API combinations to generate different VDI environments (that may include one or more VDs, or one or more VD pools) based on vendor-provided APIs (described above in reference to FIG. 1), (iv) set a minimum user count and a maximum user count to define a range of users, (v) based on (iv), select a user count (e.g., a user count that is greater than or equal to the minimum user count, or less than or equal to the maximum user count), (vi) based on (i)-(v), test (in conjunction with the analyzer (210) and for an EUE result, each VDI environment (i.e., all valid API combinations or VDI environment combinations) at the selected user count based on the resource related parameters and EUE related parameters, (vii) based on (vi), store each EUE result in the database (212), (viii) increment number of users being tested, (ix) instruct the analyzer (210) to generate a model (e.g., an ML/AI model, a trained model, etc.) that maximizes an EUE result in a VDI environment, (x) obtain customer-specific EUE related parameters from a customer/user (described below in reference to Step 326 of FIG. 3.2), (xi) based on (x), provide/send the customer-specific EUE related parameters to the analyzer (210), (xii) receive an API combination (e.g., a recommended API combination) from the analyzer (210), (xiii) based on (xii), initiate notification of the customer about a VDI environment that is generated based on the recommended API combination, and (xiv) support fundamental back-end device functions (e.g., schedule tasks, allocate back-end device resources, execute management applications and/or processes, manage peripherals (e.g., I/O devices) connected to the back-end device (200), etc.).

One of ordinary skill will appreciate that the orchestrator (208) may perform other functionalities without departing from the scope of the invention. When providing its functionalities, the orchestrator (208) may perform all, or a portion, of the methods illustrated in FIGS. 3.1 and 3.2. The orchestrator (208) may be implemented using hardware, software, or any combination thereof.

In one or more embodiments, the analyzer (210) may include functionality to, e.g.,: (i) receive an instruction (or a command) to generate a model (e.g., an ML/AI model, a trained model, etc.) that maximizes an EUE result in a VDI environment from the orchestrator (208); (ii) obtain EUE results, resource related parameters, and EUE related parameters from the database (212); (iii) obtain VDI environments, minimum user count, and maximum user count (that are tested) from the orchestrator (208); (iv) generate, by employing a set of linear, non-linear, and/or ML/AI models (e.g., a linear regression approach/model, described below), a model by training the model (i.e., the trained model) using the EUE results (obtained in (ii)), resource related parameters (obtained in (ii)), EUE related parameters (obtained in (ii)), VDI environments (obtained in (iii)), and minimum and maximum user counts (obtained in (iii)); (v) initiate notification of an administrator about the generated trained model (for example, to indicate that the trained model is ready for next steps such as the "inferencing phase" (see FIG. 3.2)); (vi) receive customer-specific EUE related parameters from the orchestrator (208); (vii) infer, using the trained model (generated in (iv)), an API combination (see, e.g., FIG. 4.3) that provides the highest EUE result among VDI environments based on the customer-specific EUE related parameters, and (viii) based on (vii), provide the API combination to the orchestrator (208).

As described above, the analyzer (210) may employ a linear regression approach while obtaining the trained model. In this approach, (i) the dependent variable for each API combination may be an EUE result in a VDI environment and (ii) the linear regression independent variables (i.e., features) may be, for example (but not limited to): a user count, a user type, a resource related parameter, a setting related to a VDI environment, an EUE related parameter, etc. Further, in this approach, linear regression (including both standard and categorical variables) may be used to generate feature coefficients, which provide sufficient information to infer an API combination that provides the highest EUE result among the targeted/candidate VDI environments.

One of ordinary skill will appreciate that the analyzer (210) may perform other functionalities without departing from the scope of the invention. When providing its functionalities, the analyzer (210) may perform all, or a portion, of the methods illustrated in FIGS. 3.1 and 3.2. The analyzer (210) may be implemented using hardware, software, or any combination thereof.

In one or more embodiments, the database (212) may be a fully managed cloud (or local) database (or any logical container) that acts as a shared storage or memory (simply storage/memory) resource (discussed above in reference to FIG. 1) that is functional to store unstructured and/or structured data. Further, the database (212) may also occupy a portion of a physical storage/memory device or, alternatively, may span across multiple physical storage/memory devices.

In one or more embodiments, the database (212) may be implemented using physical devices that provide data storage services (e.g., storing data and providing copies of previously stored data). The devices that provide data storage services may include hardware devices and/or logical devices. For example, the database (212) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (212) may include a memory device (e.g., a dual in-line memory device), in which data is stored and from which copies of previously stored data are provided. As yet another example, the database (212) may include a persistent storage device (e.g., an SSD), in which data is stored and from which copies of previously stored data is provided. As yet another example, the database (212) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (212) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (212) may store/log/record (temporarily or permanently) unstructured and/or structured data that may include (or specify), for example (but not limited to): a resource related parameter, an EUE related parameter, a customer-specific EUE related parameter (described below), an infrastructure (e.g., a VDI environment) related configuration option (e.g., "type 1" server is selected, "type 2" server is selected, "HCI 1" is activated, "HCI 2" is activated, etc.), a user type (e.g., a knowledge worker, a power worker, a task worker with relatively low-end compute requirements, a high-end user that requires a rich multimedia experience, etc.), an index of an asset (e.g., a file, a folder, etc.), an asset, recently obtained customer information (e.g., records, credentials, etc.), a cumulative history of initiated model training operations (e.g., sessions) over a prolonged period of time, a documentation that indicates a set of jobs (e.g., a VDI environment deployment job, a model training job, etc.) that has been generated, a documentation that indicates a status of a job (e.g., how many jobs are still active, how many jobs are completed, etc.), a set of SLAs (e.g., an agreement that indicates a period of time required to retain data available in the database (212)), one or more policies/rules/settings for the operation (or configuration) of any component of the back-end device (200), a data protection policy (e.g., an SLA, an affinity-based backup policy, a data protection policy that dictates 30 days retention at the database (212), etc.) implemented by an administrator of the back-end device (200) (for example, to protect the back-end device (200), to perform a rapid recovery, etc.), a configuration setting of that policy, a number of each type of a set of data protection policies implemented by an administrator of the back-end device (200), recently obtained customer activity records, a cumulative history of customer activity records obtained over a prolonged period of time, an identifier of a vendor, an identifier of a customer, application data, customer data, a list of instructions, a setting of an application, a version of an application, a version of an OS, display resolution configuration of a client, a product identifier of an application, an amount of storage used by an application, a language setting of an OS, a serial number of a client, a hardware identification (ID) number of a hardware component, an identifier of a client's manufacturer, media access control (MAC) information of a client, network connectivity information (e.g., a category of a network) of a client, an identifier of a client, a type of a client, a type of a file system, a profile of a valid user, a profile of an invalid user, one or more outputs of the processes performed by a component of the back-end device (200), one or more details of a recently deployed VDI environment, aggregated (i.e., historical (previous/past) and present) data pertaining to one or more EUE results (observed/measured/tested) in one or more VDI environments (see, e.g., Step 308 of FIG. 3.1), a VD (or a VM) state policy, a workload allocation table, a workload priority ranking, a storage I/O latency ranking, a resource health ranking, information regarding the services that are to be provided to users of the clients (e.g., 110A, 110B, etc., FIG. 1) (where the information may include, for example, identifiers of the users, priority of the users (to determine how to marshal limited computing resources in the system (e.g., 100, FIG. 1)), identifiers of the services, and/or other information that may be used to determine which services are to be provided to the respective users), etc. Based on the aforementioned data, for example, the VDI environment manager (204) may perform user analytics to infer profiles of users communicating with the back-end device (200).

In one or more embodiments, a resource (e.g., a measurable quantity of a compute-relevant resource type that may be requested, allocated, and/or consumed) may be (or may include), for example (but not limited to): a CPU, a GPU, a DPU, memory, a network resource, storage space, storage I/O, etc.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, a CPU may include, for example (but not limited to): 10-core (e.g., an individual processor within a CPU) with 3.7 gigahertz (GHz) clock speed, two channels double data rate 4 (DDR4) DRAM support, etc. In one or more embodiments, clock speed may refer to the number of instructions that a CPU is able to handle per second.

In one or more embodiments, as a central processing virtualization platform, a vCPU implementation may be provided to one or more VDs, in which the vCPU implementation may enable the VDs to have direct access to a single physical CPU. More specifically, the vCPU implementation may provide computing capabilities by sharing a single physical CPU among VDs.

In one or more embodiments, a GPU may refer to an electronic circuitry that may provide parallel data processing capabilities to generate enhanced, real-time graphics and to perform accelerated computing tasks (which is particularly useful for ML/AI related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, as a graphics virtualization platform, a vGPU implementation may be provided to one or more VDs, in which the vGPU implementation may enable the VDs to have direct access to a single physical GPU. More specifically, the vGPU implementation may provide parallel data processing and accelerated computing capabilities by sharing a single physical GPU among VDs.

In one or more embodiments, breadth-first and depth-first GPU allocation policies may be utilized for vGPU-enabled VDs. In one or more embodiments, each hypervisor may use a breadth-first or a depth-first GPU allocation policy by default. Each of these GPU allocation policies is described below.

In one or more embodiments, a breadth-first GPU allocation policy may reduce the number of vGPUs executing on one or more physical GPUs. For example, newly generated vGPUs may be placed on a physical GPU that has the fewest vGPUs already resident on it. In one or more embodiments, the breadth-first GPU allocation policy may provide higher performance because this policy reduces sharing of the physical GPUs.

In one or more embodiments, a depth-first GPU allocation policy may increase the number of vGPUs executing on one or more physical GPUs. For example, newly generated vGPUs may be placed on a physical GPU that has the most vGPUs already resident on it. In one or more embodiments, the depth-first GPU allocation policy may provide higher density of vGPUs, particularly when different types of vGPUs are being executed. However, the depth-first GPU allocation policy may also provide lower performance because this policy may maximize sharing of the physical GPUs.

In one or more embodiments, a DPU may refer to an electronic circuitry that may perform accelerated data processing and optimized data movement within a data center. In one or more embodiments, a DPU may include, for example (but not limited to): a high-speed networking interface (e.g., 200 gigabits per second (200 Gb/s)), DRAM, multi-core (e.g., 8-core) CPU, programmable acceleration engines (particularly for ML/AI, security, and telecommunications purposes), etc.

In one or more embodiments, as a data processing virtualization platform, a virtual DPU (vDPU) implementation may be provided to one or more VDs, in which the vDPU implementation may enable the VDs to have direct access to a single physical DPU. More specifically, the vDPU implementation may provide full data center-on-chip programmability, and high performance networking and computing capabilities by sharing a single physical DPU among VDs.

In one or more embodiments, memory may be any hardware component that is used to store data in a computing device (e.g., 500, FIG. 5). The data stored in memory may be accessed almost instantly (e.g., in ms) regardless of where the data is stored in the memory. In most cases, memory may provide the aforementioned instant data access because memory may be directly connected to a CPU on a wide and fast bus connection (e.g., a high-speed internal connection that transfers data between the hardware components of a computing device (e.g., 500, FIG. 5)).

In one or more embodiments, memory may be (or may include), for example (but not limited to): DRAM (e.g., DDR4 DRAM, error correcting code (ECC) DRAM, etc.), PMEM (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a NIC and a network adapter, which may be may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a LAN may connect computing devices in a defined physical space (e.g., in an office building), whereas a WAN (e.g., Internet) may connect computing devices across continents. In one or more embodiments, the computer network may be defined based on network protocols (e.g., TCP, UDP, IPv4, etc.).

In one or more embodiments, the quality of communication over a computer network may be determined by measuring the computer network's QoS. In one or more embodiments, a QoS may include one or more hardware and/or software components to guarantee the computer network's ability to run high-priority applications under limited network capacity. The hardware and/or software components operating on the computer network may accomplish this by providing differentiated handling (e.g., a networking architecture to classify and manage QoS on computer networks) and capacity allocation. In one or more embodiments, parameters that may be used to measure a QoS may include, for example (but not limited to): network BW, delay, jitter, error rate, network throughput, etc.

In one or more embodiments, storage space (or simply "storage") may refer to a hardware component that is used to store data in a computing device (e.g., 500, FIG. 5). In one or more embodiments, storage may be a physical computer-readable medium. For example, storage may be (or may include) HDDs, Flash-based storage devices (e.g., SSDs), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, for the purposes of testing a VDI environment, the orchestrator (208) may modify "storage I/O" related parameters in order to obtain an EUE result in the VDI environment. To this end, the orchestrator (208) (in conjunction with the analyzer (210)) may aggregate and/or test storage I/O specific parameters/information (e.g., backup frequency, disk/storage I/O latency (e.g., the time delay between a submission of an I/O request for data in storage and the return of the data), a file system block size, disk/storage I/O throughput, disk access or response time, etc.). In one or more embodiments, storage I/O specific information may pertain to tracked information, in the form of a data object or structure, directed to measured storage I/O latencies exhibited by a tested VDI environment (or a tested API combination).

In one or more embodiments, a resource related parameter may include (or specify), for example (but not limited to): a configurable CPU option (e.g., a valid/legitimate vCPU count per VD option), a configurable network resource option (e.g., allowability of enabling/disabling single-root input/output virtualization (SR-IOV) for specific APIs), a configurable memory option (e.g., maximum and minimum memory per VD across all VDI APIs), a configurable GPU option (e.g., allowable scheduling policy and/or vGPU count combinations), a configurable DPU option (e.g., legitimacy of disabling inter-integrated circuit (I2C) for various VDI APIs), a configurable storage space option (e.g., a list of disk cloning technologies across all VDI APIs), a configurable storage I/O option (e.g., a list of possible file system block sizes across all target file systems), an infrastructure (e.g., a VDI environment) related configuration option (described above), a user type (described above), a network resource related template (e.g., a 10 GB/s BW with 20 ms latency QoS template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a vCPU count per VD (e.g., 2, 4, 8, 16, etc.) (where certain APIs (or API calls) may have more multi-threading, which may cause a different interaction with VDs with different number of vCPUs), a speed select technology configuration (e.g., enabled, disabled, etc.) (where enabling the speed select technology may reduce overall CPU utilization (within a VDI environment) by reducing CPU utilization for some CPU cores), a VD hardware virtualization configuration (e.g., enabled, disabled, etc.) (where enabling hardware virtualization may cause more efficient utilization of CPUs within a VDI environment), a VD input/output memory management unit (IOMMU) configuration (e.g., enabled, disabled, etc.), a vNIC count per VD (e.g., 1, 2, 3, etc.) (where availability of additional vNICs may increase overall network utilization (within a VDI environment) if vNICs are spread among multiple physical NICs), a wake on LAN support configuration (e.g., supported/enabled, not supported/disabled, etc.) (where enabling the wake on LAN setting may generate additional network traffic to manage the whole wake on LAN capability), a VD host SR-IOV status configuration (e.g., enabled, disabled, etc.) (where the usage of SR-IOV may be more efficient than the usage of vNICs and may result in reduced network traffic), a swap space configuration per VD, a reserved memory configuration (e.g., as a percentage of configured memory such as 0-100%) (where a swap space configuration and a memory reservation configuration may interact to impact on overall memory utilization within a VDI environment), a memory ballooning configuration (e.g., enabled, disabled, etc.) (where enabling memory ballooning may reduce memory "waste" (utilization by inactive applications) and therefore reduce overall memory utilization within a VDI environment), a vGPU count per VD (e.g., 1, 2, 4, 8, etc.) (where an increased vGPU count may reduce overall GPU utilization within a VDI environment by scheduling activities onto unused GPUs), a type of a vGPU scheduling policy (e.g., a "fixed share" vGPU scheduling policy, an "equal share" vGPU scheduling policy, etc.) (where an equal share scheduling may reduce overall GPU utilization within a VDI environment when users are inactive), a type of a GPU virtualization approach (e.g., graphics vendor native drivers approach such as a vGPU, hypervisor-enabled drivers approach such as virtual shared graphics acceleration (vSGA), etc.) (where the use of vendor native approach (such as vGPU) may be more efficient in terms of overall GPU utilization (within a VDI environment) than synthetic software approaches (such as vSGA)), a storage mode configuration (e.g., an enabled high-performance storage array mode, a disabled high-performance storage array mode, an enabled general storage (i.e., co-processor) mode, a disabled general storage mode, etc.) (where different levels of network traffic (per user) may result from the configuration of different DPU modes-reconfiguration may be appropriate if reduced DPU utilization is needed to maximize an EUE result), a QoS guarantee configuration (e.g., continuous variable such as up to Gb/s) (where increasing QoS guarantee may increase DPU activity required for increased (per user) resources provided by a DPU), an I2C interface configuration (e.g., an enabled I2C interface, a disabled I2C interface, etc.) (where disabling an I2C interface may affect manageability of per user (or overall) DPU utilization within a VDI environment), a type of cloning technology (e.g., an instant clone technology, a linked clone technology, a full clone technology, etc.) (where using full clone technology may use dramatically more storage space than delta disk technologies such as linked and instant clone technologies), a "memory swap file to hard disk size" ratio configuration (e.g., 0-100%) (where reducing a swap space size may reduce overall storage space usage within a VDI environment, but with the risk of reduced EUE), a user profile folder redirection configuration (e.g., a local user profile, a profile redirection, etc.), a file system block size (e.g., 2 megabytes (MB) block size, 8 MB block size, etc.) (where increasing a block size may result in reduced storage I/O—the opposite also applies), a backup frequency (e.g., hourly, daily, monthly, etc.) (where an increased backup frequency may result in increased storage I/O on a per user basis within a VDI environment), a number of VDs available for logon (e.g., 0, 10, 20, etc.) (where increased numbers of VDs that are powered on and available for logon may result in reduced storage I/O on a per user basis within a VDI environment), different work start time configurations with respect to a number of VDs to be powered on and available (where powering on more VDs at the same time may result in degraded EUE but reduced input/output operations per second (IOPS)), a virtualization-relevant resource parameter (e.g., a VD disk I/O latency, a VD I/O operation per second, etc.), CPU/GPU wait time, etc.

In one or more embodiments, an EUE related parameter may include (or specify), for example (but not limited to): a logon time threshold (e.g., a logon time by a user of a client (e.g., 110A, 110B, etc. FIG. 1) to a VD that is executing on the corresponding VDI environment), a client frame rate threshold for an application, an end-to-end user latency threshold for an application (e.g., latency from a VD instance to an application that it uses, latency between a user and a VD instance with respect to an application, etc. (those may be useful to monitor (see Step 334 of FIG. 3.2) in order to provide further granularity in making latency-related decisions (e.g., generating another API combination to deliver the best user experience for end users)), client image quality for an application, network latency, application launch time at a VD, a display device brightness configuration, a display device color configuration, a display device contrast configuration, a display device speaker volume configuration, a latency issue associated with execution of computer readable program code at a VD, a number of open ports (e.g., having more open ports may be more efficient in terms of CPU/GPU/DPU utilization), an identifier of a service, a port policy, and/or of a corresponding port (which may be useful while provisioning the respective services and/or ports; and/or while modifying the respective port policies (e.g., open/closed) to manage network traffic and traffic classes), a "best" practice in relation to an open port, an infrastructure (e.g., a VDI environment) related configuration option (e.g., "type 1" server is selected, "type 2" server is selected, "HCI 1" is activated, "HCI 2" is activated, etc.), etc.

In one or more embodiments, a customer-specific EUE related parameter (e.g., information gathered from the customer in relation to constraints relevant to a flex on demand VDI environment and an EUE related parameter may include (or specify), for example (but not limited to): a minimum user count (e.g., each VD should support minimum 50 users), a maximum user count (e.g., each VD should support maximum 350 users), a logon time threshold (e.g., logon time should be less than 30 seconds), a client frame rate threshold for an application (e.g., for video production via Application X, the client frame rate should be 20 frames per second (FPS)), an end-to-end user latency threshold for an application (e.g., for Application G, end-to-end user latency should be less than 25 ms), a network port open/close integrity configuration option (e.g., network port open/close integrity should be supported), a threshold for client image quality for an application, a display device brightness configuration option, a display device color configuration option, a display device contrast configuration option, a display device speaker volume configuration option, an infrastructure (e.g., a VDI environment) related configuration option, etc.

In one or more embodiments, the unstructured and/or structured data may be updated (automatically) by third party systems (e.g., platforms, marketplaces, etc.) (provided by vendors) or by administrators based on, for example, newer (e.g., updated) versions of SLAs being available. The unstructured and/or structured data may also be updated when, for example (but not limited to): a newer VDI environment is deployed, a set of jobs is received, etc.

In one or more embodiments, the database (212) may provide an indexing service. For example, an agent (not shown) of the database (212) may receive various model training related inputs directly (or indirectly) from the orchestrator (208). Upon receiving, the agent may analyze those inputs to generate an index(es) (e.g., a training process index(es)) for optimizing the performance of the database (212) by reducing a required amount of database access(es) when implementing a request (e.g., a data retrieval request received from the analyzer (210)). In this manner, requested data may be quickly located and accessed from the database (212) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the VDI environment manager (204) and an administrator of the back-end device (200). The VDI environment manager (204) and the administrator may add, remove, and/or modify those data in the database (212) to cause the information included in the database (212) to reflect the latest version of, for example, SLAs. The unstructured and/or structured data available in the database (212) may be implemented using, for example, lists, tables, unstructured data, structured data, etc. While described as being stored locally, the unstructured and/or structured data may be stored remotely, and may be distributed across any number of devices without departing from the scope of the invention.

While the database (212) has been illustrated and described as including a limited number and type of data, the database (212) may store additional, less, and/or different data without departing from the scope of the invention. In the embodiments described above, the database (212) is demonstrated as a part of the back-end device (200); however, embodiments herein are not limited as such. The database (212) may be a separate entity from the back-end device (200).

One of ordinary skill will appreciate that the database (212) may perform other functionalities without departing from the scope of the invention. When providing its functionalities, the database (212) may perform all, or a portion, of the methods illustrated in FIGS. 3.1 and 3.2. The database (212) may be implemented using hardware, software, or any combination thereof.

In one or more embodiments, the VDI environment (202), the VDI environment management (204), the monitoring component (206), the orchestrator (208), the analyzer (210), and the database (212) may be utilized in isolation and/or in combination to provide the above-discussed functionalities. These functionalities may be invoked using any communication model including, for example, message passing, state sharing, memory sharing, etc. By doing so, the back-end device (200) may address issues related to data security, integrity, and availability proactively.

Further, some of the above-discussed functionalities may be performed using available resources or when resources of the back-end device (200) are not otherwise being consumed. By performing these functionalities when resources are available, these functionalities may not be burdensome on the resources of the back-end device (200) and may not interfere with more primary workloads performed by the back-end device (200).

FIGS. 3.1 and 3.2 show a method for EUE maximization-based flex on demand in a multi-API VDI environment in accordance with one or more embodiments of the invention. More specifically, (i) FIG. 3.1 shows the initial "ML/AI model training (based on "synthetic data") and load-testing phase" of the overall method to maximize an EUE result in a VDI environment, and (ii) FIG. 3.2 shows the "inferencing/optimizing phase (based on "real data (i.e., data that is obtained from users/customers)")" of the overall method to infer an API combination that provides the highest EUE result among different VDI environments. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed orchestrator (e.g., 208, FIG. 2) and the analyzer (e.g., 210, FIG. 2). Other components of the system (100) illustrated in FIG. 1 may also execute all or part of the method shown in FIG. 3.1 without departing from the scope of the invention.

In Step 300, the orchestrator receives a request from a requesting entity (e.g., a user/customer of a client of the clients (e.g., 110A, 110B, etc., FIG. 1), an administrator terminal, etc.) that wants to use a VDI environment that provides the highest EUE result.

In response to receiving the request, as part of that request, and/or in any other manner, the orchestrator obtains (or retrieves) one or more resource related parameters (e.g., valid/authenticated/legal physical or virtual infrastructure configuration options/parameters such as a range of CPU models, a range of memory configurations, etc.) for one or more resources, one or more EUE related parameters, and user types (e.g., a knowledge worker, a power worker, a task worker with relatively low-end compute requirements, a high-end user that requires a rich multimedia experience, etc.) from the database (e.g., 212, FIG. 2).

In one or more embodiments, a resource utilization value of a resource may not be important/useful to maximize an EUE result in a VDI environment (under test); however, changing/modifying resource related parameters (as a configuration option) may affect the EUE result in the VDI environment. For example, testing a VDI environment with 4 vNICs per VD rather than 2 vNICs per VD may result in reduced latency towards maximizing the EUE result in the VDI environment. To this end, the resource related parameters may be obtained from the database so that those parameters may be used while testing different valid API combinations (see Step 308).

In one or more embodiments, the resource related parameters and EUE related parameters may be obtained/accessed (for example, by querying the database) to obtain data to be used in at least (i) testing one or more VDI environments (see Step 308) and (ii) generating a trained ML/AI model that maximizes an EUE result in a VDI environment (see Step 322). Details of the resource, resource related parameters, and EUE related parameters are described above in reference to FIG. 2.

In Step 302, the orchestrator assembles one or more (different) API combinations (or one or more API call combinations as variables) to generate different VDI environments based on (the functionalities/capabilities/features of recommended) vendor-provided APIs (which (i) may already exist in the VDI environment manager (e.g., 204, FIG. 2) and (ii) may include information related to the provided API (e.g., an identifier of the associated vendor, a technical documentation, etc.)). For example, different APIs may need to be used: (i) to interact with capabilities/features available to VMware services, VMware Cloud Services APIs may be used/assembled; (ii) to interact with capabilities/features of VMware Cloud on Amazon Web Services (AWS), VMware Cloud (VMC) APIs may be used/assembled; (iii) to interact with capabilities/features of a deployed software-defined data center (SDDC), vSphere APIs may be used/assembled; (iv) to interact with capabilities/features specific to VMware Cloud Foundation (VCF), VCF APIs may be used/assembled; and (v) to interact with native AWS capabilities/features, Elastic Compute Cloud (EC2) APIs may be used/assembled. Details of the vendor-provided APIs are described above in reference to FIG. 1.

In Step 304, the orchestrator sets a minimum user count and a maximum user count. In one or more embodiments, there may be a user range specifying at least a minimum user count and a maximum user count, in which, for example, for a large enterprise customer, the minimum user count may be 1000 and the maximum user count may be 3000.

In Step 306, based on Step 304, the orchestrator selects a user count that is greater than or equal to the minimum user count, or less than or equal to the maximum user count. In one or more embodiments, the minimum and maximum user counts may be parameters of at least an ML/AI model (see Step 322).

In Step 308, for an EUE result, the orchestrator tests (e.g., "load" tests) each VDI environment (i.e., all valid API combinations/VDI environment configurations) in terms of, for example, compatibility, functionality, and EUE at the selected user count (see Step 306) (for example, a specific user count may produce resource utilization levels in a VDI environment that would result in the VDI environment not being able to successfully implement some architected EUE enhancing system calls and processes) based on the resource related parameters, EUE related parameters, and user types (obtained in Step 300). As indicated, the testing process will be across a large range of (artificial) users (e.g., 1 user to 10,000 users) and during the process, the orchestrator (more specifically, the load testing software/model) may communicate with the VDI environment manager for, for example, logging users into VDs, gathering information in relation to identifiers of VD pools and/or health (or status) of VDs, etc.

In one or more embodiments, to capture/obtain at least an EUE result in a VDI environment during the testing process (with little to no human interaction), the orchestrator (i) may monitor and/or query the elements/operations (e.g., based on function calls from both physical client devices and/or other devices) in a VDI environment (including one or more VDs) under test, (ii) may sort a list of generated VDs (for example, within a VDI environment under test) based on their EUE results, (iii) may hold an assembled API combination as a constant and then cycling through each of the number of users (e.g., starting from 1 user and going up to 10,000 users), (iv) may generate one or more logical compute pools providing features such as automatic resource load-balancing, and (v) for example, once the orchestrator has reached "10,000" users, may test another API combination based on (i)-(iv) (e.g., testing different user counts for each possible API combination, workload/resource types, and configuration parameters).

In Step 310, the orchestrator stores each EUE result (and other possible outputs (e.g., other monitored data) of a testing process) in the database (temporarily or permanently), in which the stored data may be used as one or more parameters, for example, while generating (and/or training) an ML/AI model (see Step 322).

In Step 312, the orchestrator increments the user count (which may be a part of a "user count" counter) to obtain an "incremented user count".

In Step 314, the orchestrator makes a determination as to whether a maximum user count has been reached. Accordingly, in one or more embodiments, if the result of the determination is YES (said another way, the testing process for the targeted range of users has been completed), the method proceeds to Step 316. If the result of the determination is NO, the method alternatively returns to Step 306, in which the Steps 306-312 may be performed or repeated for the incremented user count (e.g., the subsequent user count). In one or more embodiments, each iteration of the aforementioned steps (i.e., Steps 306-312), directed to an EUE result in a VDI environment, may be performed sequentially or in parallel.

In Step 316, as a result of the determination in Step 314 being YES, the orchestrator instructs the analyzer to generate a model (e.g., an ML/AI model) that maximizes an EUE result in a VDI environment (e.g., as an optimization target).

In Step 318, in response to receiving the instruction(s) from the orchestrator (in Step 316), the analyzer obtains EUE results, resource related parameters, and EUE related parameters from the database.

In Step 320, in response to receiving the instruction(s) from the orchestrator (in Step 316), the analyzer obtains the VDI environments (see Step 308), minimum user count, and maximum user count that are tested from the orchestrator.

In Step 322, in response to receiving the instruction(s) from the orchestrator (in Step 316), the analyzer generates a model (e.g., an ML/AI model) and trains that model to obtain a "trained model". In order to train the model, the analyzer may use at least the EUE results, resource related parameters, EUE related parameters, VDI environments, and minimum and maximum user counts. In one or more embodiments, the trained model may then be used for inferencing purposes (or for the "inferencing phase", see FIG. 3.2).

In Step 324, after generating the trained model (in Step 322) (e.g., after the load-testing based training is completed, and ready for inferencing and further training based on "real data"), the analyzer initiates notification of an administrator/user (of the corresponding back-end device (e.g., 200, FIG. 2)) about the generated "trained" model. The notification may include, for example (but not limited to): for what purpose the model has been trained, the range of users that has been taken into account while training the model, the amount of time that has been spent while performing the training process, etc.

In one or more embodiments, the notification may also indicate whether the training process was completed within the predetermined window, or whether the process was completed after exceeding the predetermined window. The notification may be displayed on a GUI of the corresponding back-end device.

In one or more embodiments, the method may end following Step 324.

Turning now to FIG. 3.2, the method shown in FIG. 3.2 may be executed by, for example, the above-discussed orchestrator and analyzer. Other components of the system (100) illustrated in FIG. 1 may also execute all or part of the method shown in FIG. 3.2 without departing from the scope of the invention.

In Step 326, the orchestrator obtains (or receives) customer-specific (e.g., customer-specified, customer-preferred, etc.) EUE related parameters (described above in reference to FIG. 2) from the customer (where, for example, the customer may wish or deem necessary to have a VDI environment that satisfies the customer-specific EUE related parameters).

In one or more embodiments, the "customer-provided" customer-specific EUE related parameters (i.e., the real data; the customer's functionality and EUE requirements or constraints in relation to a range of users, workload/resource types, and configuration parameters (e.g., a particular display device brightness/contrast preferred by a user or required by an organization, a display device color configuration preferred by a user or required by an organization, etc.); organizational requirements; etc.) may be obtained, for example, by the orchestrator polling the corresponding client (e.g., by making an API call to the client). In one or more embodiments, customer-specific EUE related parameters may further aid (and/or may further provide insights) towards inferring/finding/recommending/configuring an optimal API combination/VDI environment configuration (or an optimal set of API calls for an initial VDI environment deployment) that will provide (i) the highest EUE result among different VDI environments and (ii) the best and consistent customer experience (for example, with respect to the VDI environment functionality and VD configuration functionality) to the customer. In one or more embodiments, upon receiving the customer-specific EUE related parameters, the orchestrator may store (temporarily or permanently) a copy of the customer-specific EUE related parameters in the database.

In Step 328, the orchestrator provides the customer-specific EUE related parameters to the analyzer.

In Step 330, (i) upon receiving the customer-specific EUE related parameters, (ii) using its inference/recommendation engine, and (iii) by employing the trained model (generated in Step 322 of FIG. 3.1), the analyzer infers an API combination that provides the highest EUE result among different candidate VDI environments (and across all users within the targeted range of users) based on the customer-specific EUE related parameters (and by cycling through different configuration parameters (e.g., API calls, resource-specific configuration parameters, infrastructure related configuration parameters, etc.)).

As indicated above, the optimal VDI environment configuration will be the combination of API calls and physical and virtual configuration options that generated the highest EUE result across the range of user counts and allowable configurations (provided by the specific customer).

Further, as indicated above, the inferencing process may occur across, for example, (i) all technically/operationally valid and customer-allowed combinations of APIs from all possible vendors that are necessary to carry out all possible VDI environment lifecycle/management activities, (ii) all technically/operationally valid and customer-allowed VDI environment configuration options, and (iii) all technically/operationally valid and customer-allowed physical/logical environment configuration options in order to honor customer requirements/conditions, and to provide the best and consistent customer experience.

In one or more embodiments, upon inferring the optimal API combination, the orchestrator may store (temporarily or permanently) a copy of the combination in the database.

In Step 332, the analyzer provides the optimal API combination to the orchestrator.

In Step 334, after obtaining the optimal API combination from the analyzer, the orchestrator initiates notification of the customer (that sent the request in Step 300 of FIG. 3.1) about a VDI environment that will be generated (or is generated) based on the optimal API combination. The notification may include, for example (but not limited to): the number of VDs included in the VDI environment, one or more technical details with respect to the resources available in the VDI environment, one or more technical details with respect to the EUE in the VDI environment, etc.

In one or more embodiments, the notification may indicate whether the operation was completed within the predetermined window, or whether the operation was completed after exceeding the predetermined window. The notification may be displayed on the GUI of the corresponding client.

In one or more embodiments, upon obtaining the optimal API combination, the orchestrator may transmit the optimal API combination to the VDI environment manager so that the VDI environment manager may deploy the corresponding VDI environment for the customer. In one or more embodiments, if a retransmission of the combination is required (when, for example, a receipt acknowledgement has not been received by the orchestrator for the combination after a predetermined period of time), the orchestrator may retransmit the combination. To this end, the orchestrator may monitor acknowledgement(s) generated by the VDI environment manager so that the orchestrator may determine whether the combination has been successfully delivered (so that, for example, the orchestrator's resources may become free to perform a subsequent process) or needs to be retransmitted.

Further, upon transmission, the orchestrator may log the details (e.g., an identifier of the optimal API combination that has been transmitted, total size of data that has been transmitted, etc.) of the transmission in the database.

In one or more embodiments, once the VDI environment is deployed and as part of an analytics-based approach, the monitoring component (e.g., 206, FIG. 2) may obtain/track actual usage/EUE information (for example, through its telemetry/monitoring tools (e.g., a logon time monitoring tool (e.g., Lakeside Systrack tool), an endpoint frame rate monitoring tool (e.g., nVector monitoring tool), application-specific end-to-end (i.e., data center to endpoint and backwards) monitoring tool (e.g., Lakeside Systrack tool)), etc.) with respect to the VDI environment and/or the corresponding client/endpoint (e.g., user activities that are performed within the VDI environment, data related to EUE (e.g., a virtual helpdesk ticketing system data (any feedback describing issues or complaints as to the experiences the user is having during the user's interaction with the VDI environment executing the corresponding VD(s) on the user's behalf) related to poor EUE experienced by the user in the VDI environment, frame rate and image quality data associated with the corresponding client/endpoint, etc.), behavioral activities (e.g., a time when the customer logged in to the customer account, the logon time associated with the time it takes to initiate and provide credentials to create a VD instance on the VDI environment, the duration of time a VD instance takes to launch an application using allocated resources, a location where the customer logged in to the customer account to connect to the VDI environment (to monitor and minimize, for example, end-to-end user latency), keystroke dynamics of the customer at the VDI environment, a duration of the management session, etc.), page load time, packet loss, resource download time, network traffic (may be monitored to compile statistics related to latency for particular VDs and for particular applications or types of network traffic), etc.) to determine, at least, whether the API combination recommendation should be updated based on the actual usage information (for a better customer experience/satisfaction during the operation of the corresponding VDI environment, for an increased productivity, and for (further) maximizing the EUE result in the corresponding VDI environment).

To this end, the actual usage information may be used to further train (by the analyzer) the trained model (where the main training was performed (before the deployment) in Step 322 of FIG. 3.1), and consequently, the inferred optimal API combination (in Step 330) may be updated (e.g., another API combination may be recommended as an optimal API combination (e.g., a newer optimal API combination) to generate a second VDI environment). Thereafter, the orchestrator may transmit the newer optimal API combination to the VDI environment manager so that the VDI environment manager may deploy the second VDI environment for the customer (so that the service provider of the corresponding back-end device may honor its commitment to the customer about providing the optimal and cost-effective VDI environment in relation to EUE).

In one or more embodiments, upon obtaining the newer optimal API combination (from the analyzer), the orchestrator may store (temporarily or permanently) a copy of the newer optimal combination in the database.

In one or more embodiments, the method may end following Step 334.

To further clarify embodiments of the invention, a non-limiting example use case is provided in FIGS. 4.1-4.3.

Start of Example

The example use case, illustrated in FIGS. 4.1-4.3, is not intended to limit the scope of the embodiments disclosed herein and is independent from any other examples discussed in this application.

Turning to the example, FIGS. 4.1-4.3 show a diagram of components of a system (not shown) similar to that of FIG. 1. For the sake of brevity, not all components of the system may be illustrated in FIGS. 4.1-4.3.

Assume here that FIG. 4.1 illustrates an embodiment in which (a) Vendor A (402) includes (at least): (i) Vendor A configuration intake API, (ii) Vendor A provisioning API, (iii) Vendor A deployment API, (iv) Vendor A lifecycle management API, and (v) Vendor A VD decommissioning API; (b) Vendor B (404) includes (at least): (i) Vendor B configuration intake API, (ii) Vendor B provisioning API, (iii) Vendor B deployment API, (iv) Vendor B lifecycle management API, and (v) Vendor B VD decommissioning API; and (c) Vendor C (406) includes (at least): (i) Vendor C configuration intake API, (ii) Vendor C provisioning API, (iii) Vendor C deployment API, (iv) Vendor C lifecycle management API, and (v) Vendor C VD decommissioning API.

Further, assume here that the orchestrator (400) receives a request from a user/customer of a client (not shown) that wants to use a VDI environment that provides the highest EUE. In response to receiving the request, the orchestrator (400) assembles one or more API combinations to generate different VDI environments (e.g., VDI Environment X, VDI Environment Y, and VDI Environment Z) based on (the functionalities/capabilities/features of recommended) vendor-provided APIs (e.g., APIs provided from Vendor A (402), Vendor B (404), and Vendor C (406)). As shown in FIG. 4.1, the orchestrator (400) generates (indicated with (4)): (i) VDI Environment X by assembling Vendor A configuration intake API (indicated with (1)), Vendor A deployment API (indicated with (1)), and Vendor B provisioning API (indicated with (3)); (ii) VDI Environment Y by assembling Vendor C configuration intake API (indicated with (2)), Vendor C provisioning API (indicated with (2)), and Vendor B decommissioning API (indicated with (3)); and (iii) VDI Environment Z by assembling Vendor B configuration intake API (indicated with (3)), Vendor B deployment API (indicated with (3)), and Vendor B provisioning API (indicated with (3)).

Turning now to FIG. 4.2, FIG. 4.2 illustrates an embodiment (that describes the "load-testing phase") in which Database (410) includes (at least) network resource related parameters and EUE related parameters. As shown in FIG. 4.2, the network resource related parameters include (or specify): (i) 2 vNICs per VD, (ii) wake on LAN support enabled, and (iii) wake on LAN support disabled. Further, the EUE related parameters include (or specify): (i) a logon time threshold, (ii) a client frame rate threshold for an application, and (iii) an end-to-end user latency threshold for an application.

In response to receiving the request (discussed above in reference to FIG. 4.1), the orchestrator (400) obtains (or retrieves) the network resource related parameters and EUE related parameters (indicated with (1)) form Database (410). Thereafter, for an EUE result, the orchestrator (400) tests (indicated with (2)) each VDI environment (i.e., VDI Environments X-Z, see FIG. 4.1) in terms of compatibility, functionality, and EUE across a range of users based on the network resource related parameters, EUE related parameters, and user types.

The orchestrator (400) then stores each EUE result in Database (410) (temporarily or permanently) and instructs the analyzer (415) to generate an ML/AI model that maximizes an EUE result in a VDI environment. In response to receiving the instruction(s) from the orchestrator (400), the analyzer (415) obtains: (i) minimum and maximum user counts, and (ii) VDI Environments X-Z that are tested from the orchestrator (400) (indicated with (3)). Further, in response to receiving the instruction(s) from the orchestrator (400), the analyzer (415) also obtains (i) EUE results, (ii) network resource related parameters, and (iii) EUE related parameters from Database (410) (indicated with (4)).

Additionally, in response to receiving the instruction(s) from the orchestrator (400), the analyzer (415) generates the ML/AI model and trains that model to obtain a "trained model" (indicated with (5)). In order to train the model, the analyzer (415) uses (at least) the (i) EUE results, (ii) network resource related parameters, (iii) EUE related parameters, (iv) VDI Environments X-Z, and (v) minimum and maximum user counts. The trained model is then used for inferencing purposes (see FIG. 4.3). After generating the trained model, the analyzer initiates notification of an administrator/user (of the corresponding back-end device (not shown)) about the generated "trained" model.

Turning now to FIG. 4.3, FIG. 4.3 illustrates an embodiment that describes the "inferencing phase". Assume here that customer-specific EUE related parameters includes/specifies (at least): (i) logon time should be less than 30 seconds, (ii) for video production via Application R, client frame rate should be 20 FPS, (iii) for Application H, end-to-end user latency should be less than 25 ms, and (iv) each VD should support minimum of 50 users and maximum of 350 users.

In order to perform the inferencing phase, the orchestrator (400) obtains (or receives) the customer-specific EUE related parameters from the customer (via the corresponding client (not shown) (indicated with (1)). The orchestrator (400) then provides the customer-specific EUE related parameters to the analyzer (415) (indicated with (2)).

Upon receiving the customer-specific EUE related parameters and by employing the trained model (generated in FIG. 4.2), the analyzer (415) infers (indicated with (3)) an API combination that provides the highest EUE result among all possible API combinations (and across all users within the targeted range of users) based on the customer-specific EUE related parameters. Thereafter, the analyzer (415) provides the API combination to the orchestrator (400), in which the orchestrator (400) initiates notification of the customer (that sent the request in FIG. 4.1) about a VDI environment that will be generated. To this end, the orchestrator (400) transmits the API combination to the VDI environment manager (not shown) so that the VDI environment manager deploys the corresponding VDI environment (e.g., VDI Environment P) for the customer. As shown in FIG. 4.3, the VDI Environment P is generated by assembling Vendor A configuration intake API, Vendor C deployment API, and Vendor B provisioning API.

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing virtual desktop infrastructure (VDI) environments, the method comprising:

obtaining, by an orchestrator, a resource related parameter (RRP) for a resource and an end-user experience (EUE) related parameter from a database;

assembling, by the orchestrator, an application programming interface (API) combination to generate a VDI environment based on a plurality of vendor-provided APIs;

testing, by the orchestrator, the VDI environment across a range of users based on the RRP and the EUE related parameter to generate a set of EUE results, wherein the set of EUE results is stored in the database;

providing, by the orchestrator, the range of users and the VDI environment to an analyzer, wherein the analyzer is instructed by the orchestrator to generate a model that maximizes an EUE result in the VDI environment;

generating, by the analyzer, a trained model by training the model using at least the range of users, the VDI environment, the EUE related parameter, the RRP, and the set of EUE results, wherein the RRP, the EUE related parameter, and the EUE results are obtained from the database;

providing, by the orchestrator, a customer-specific EUE related parameter to the analyzer, wherein the customer-specific EUE related parameter is received from a customer;

inferring, by the analyzer and using the trained model, a second API combination that provides the highest EUE result among a plurality of API combinations based on the customer-specific EUE related parameter, wherein the plurality of API combinations comprises at least the API combination and the second API combination; and initiating, by the orchestrator, deployment of a second VDI environment that is generated based on the second API combination, wherein the second API combination is received from the analyzer.

2. The method of claim 1, wherein the customer-specific EUE related parameter specifies at least one selected from a group consisting of a minimum user count, a maximum user count, a logon time threshold, a client frame rate threshold for an application, and an end-to-end user latency threshold for a second application.

3. The method of claim 1, wherein the plurality of vendor-provided APIs comprises at least one selected from a group consisting of a configuration intake API, a provisioning API, a deployment API, a lifecycle management API, and a virtual desktop decommissioning API.

4. The method of claim 1, wherein the API combination comprises at least a provisioning API, a deployment API, and a lifecycle management API.

5. The method of claim 1, wherein the range of users specifies at least a minimum user count and a maximum user count.

6. The method of claim 1, wherein the resource is a central processing unit (CPU), a graphics processing unit (GPU), a data processing unit (DPU), memory, a network resource, storage space, or storage input/output (I/O).

7. The method of claim 1, wherein the RRP specifies at least one selected from a group consisting of a virtual network interface card (vNIC) count per virtual desktop (VD), a wake on local area network (LAN) support configuration, a VD host single-root input/output virtualization (SR-IOV) status configuration, and a type of a third VDI environment.

8. The method of claim 1, wherein the RRP specifies at least one selected from a group consisting of a virtual central processing unit (vCPU) count per virtual desktop (VD), a speed select technology configuration, a VD hardware virtualization configuration, a VD input/output memory management unit configuration, and a type of a third VDI environment.

9. The method of claim 1, wherein the EUE related parameter specifies at least one selected from a group consisting of a maximum logon time threshold, a client frame rate threshold for an application, a maximum end-to-end user latency threshold, and a type of a third VDI environment.

10. A method for managing virtual desktop infrastructure (VDI) environments, the method comprising:

obtaining, by an orchestrator, a resource related parameter (RRP) for a resource and an end-user experience (EUE) related parameter from a database;

assembling, by the orchestrator, an application programming interface (API) combination to generate a VDI environment based on a plurality of vendor-provided APIs;

testing, by the orchestrator, the VDI environment across a range of users based on the RRP and the EUE related parameter to generate a set of EUE results, wherein the set of EUE results is stored in the database;

providing, by the orchestrator, the range of users and the VDI environment to an analyzer, wherein the analyzer is instructed by the orchestrator to generate a model that maximizes an EUE result in the VDI environment;

generating, by the analyzer, a trained model by training the model using at least the range of users, the VDI environment, the EUE related parameter, the RRP, and the set of EUE results, wherein the RRP, the EUE related parameter, and the EUE result are obtained from the database; and initiating, by the analyzer, notification of an administrator about the trained model.

11. The method of claim 10, further comprising:

after the notification of the administrator:

providing, by the orchestrator, a customer-specific EUE related parameter to the analyzer, wherein the customer-specific EUE related parameter is received from a customer;

inferring, by the analyzer and using the trained model, a second API combination that provides the highest EUE result among a plurality of API combinations based on the customer-specific EUE related parameter, wherein the plurality of API combinations comprises at least the API combination and the second API combination; and initiating, by the orchestrator, notification of the customer about a second VDI environment that is generated based on the second API combination, wherein the second API combination is received from the analyzer.

12. The method of claim 11, wherein the customer-specific EUE related parameter specifies at least one selected from a group consisting of a minimum user count, a maximum user count, a logon time threshold, a client frame rate threshold for an application, and an end-to-end user latency threshold for a second application.

13. The method of claim 10, wherein the plurality of vendor-provided APIs comprises at least one selected from a group consisting of a configuration intake API, a provisioning API, a deployment API, a lifecycle management API, and a virtual desktop decommissioning API.

14. The method of claim 10, wherein the resource is a central processing unit (CPU), a graphics processing unit (GPU), a data processing unit (DPU), memory, a network resource, storage space, or storage input/output (I/O).

15. The method of claim 10, wherein the RRP specifies at least one selected from a group consisting of a virtual network interface card (vNIC) count per virtual desktop (VD), a wake on local area network (LAN) support configuration, a VD host single-root input/output virtualization (SR-IOV) status configuration, and a type of a second VDI environment.

16. The method of claim 10, wherein the EUE related parameter specifies at least one selected from a group consisting of a maximum logon time threshold, a client frame rate threshold for an application, a maximum end-to-end user latency threshold, and a type of a second VDI environment.

17. A method for managing virtual desktop infrastructure (VDI) environments, the method comprising:

providing, by an orchestrator, a customer-specific end-user experience (EUE) related parameter to an analyzer, wherein the customer-specific EUE related parameter is received from a customer;

inferring, by the analyzer and using a trained model, an application programming interface (API) combination that provides the highest EUE result among a plurality of API combinations based on the customer-specific EUE related parameter, wherein the plurality of API combinations comprises at least the API combination and a second API combination; and initiating, by the orchestrator, notification of the customer about a VDI environment that is generated based on the API combination, wherein the API combination is received from the analyzer.

18. The method of claim 17, further comprising:

prior to providing the customer-specific EUE related parameter to the analyzer:

obtaining, by the orchestrator, a resource related parameter (RRP) for a resource and an EUE related parameter from a database;

assembling, by the orchestrator, the second API combination to generate a second VDI environment based on a plurality of vendor-provided APIs;

testing, by the orchestrator, the second VDI environment across a range of users based on the RRP and the EUE related parameter to obtain a set of EUE results, wherein the set of EUE results is stored in the database;

providing, by the orchestrator, the range of users and the second VDI environment to the analyzer, wherein the analyzer is instructed by the orchestrator to generate a model that maximizes an EUE result in the second VDI environment;

generating, by the analyzer, the trained model by training the model using at least the range of users, the second VDI environment, the EUE related parameter, the RRP, and the set of EUE results, wherein the RRP, the EUE related parameter, and the EUE result are obtained from the database; and initiating, by the analyzer, notification of an administrator about the trained model.

19. The method of claim 18, wherein the EUE related parameter specifies at least one selected from a group consisting of a maximum logon time threshold, a client frame rate threshold for an application, a maximum end-to-end user latency threshold, and a type of a third VDI environment.

20. The method of claim 17, wherein the customer-specific EUE related parameter specifies at least one selected from a group consisting of a minimum user count, a maximum user count, a logon time threshold, a client frame rate threshold for an application, and an end-to-end user latency threshold for a second application.

* * * * *